United States Patent [19]
Usui

[11] Patent Number: 6,124,982
[45] Date of Patent: Sep. 26, 2000

[54] ZOOM LENS

[75] Inventor: Fumiaki Usui, Utsunomiya, Japan

[73] Assignee: Canon Kabushiki Kaisha, Tokyo, Japan

[21] Appl. No.: 09/110,690

[22] Filed: Jul. 7, 1998

[30] Foreign Application Priority Data

Jul. 11, 1997 [JP] Japan ................................. 9-186501

[51] Int. Cl.$^7$ .................................................. G02B 15/14
[52] U.S. Cl. ........................ 359/686; 359/683; 359/687; 359/688; 359/676
[58] Field of Search .................................. 359/676, 683, 359/686, 687, 688

[56] References Cited

U.S. PATENT DOCUMENTS

| | | | |
|---|---|---|---|
| 5,737,128 | 4/1998 | Usui ........................................ | 359/686 |
| 5,745,300 | 4/1998 | Usui et al. .............................. | 359/684 |
| 5,751,497 | 5/1998 | Usui et al. .............................. | 359/687 |

FOREIGN PATENT DOCUMENTS 6-242378   9/1994   Japan .

*Primary Examiner*—Georgia Epps
*Assistant Examiner*—Suzanne Letendre
*Attorney, Agent, or Firm*—Fitzpatrick, Cella, Harper & Scinto

[57] ABSTRACT

This specification discloses a zoom lens which has, in succession from the object side, a first lens unit of positive refractive power, a second lens unit of negative refractive power for focal length change, a third lens unit for correcting the changing of an imaging plane resulting from a focal length change, and a fourth lens unit of positive refractive power, and in which an aspherical surface AS1 is provided on at least one lens surface constituting the first lens unit and satisfying $1.65 < hw/ht$ and $1.15 < hw/hz$, where ht is the maximum incidence height of an on-axis light beam, hw is the incidence height of an off-axis light beam of a maximum angle of view at the wide angle end, and hz is the incidence height of the off-axis light beam of a maximum angle of view at a zoom position at a variable power ratio $Z^{1/4}$, and the power disposition and achromatism condition of the first lens unit, a focusing system, etc. are appropriately set.

7 Claims, 30 Drawing Sheets

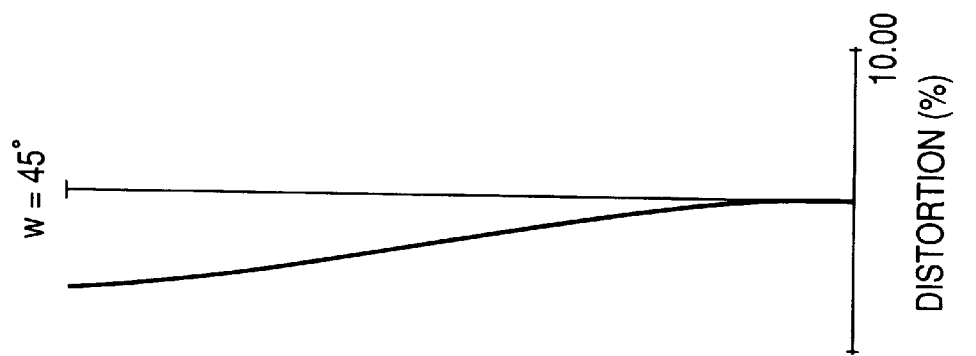
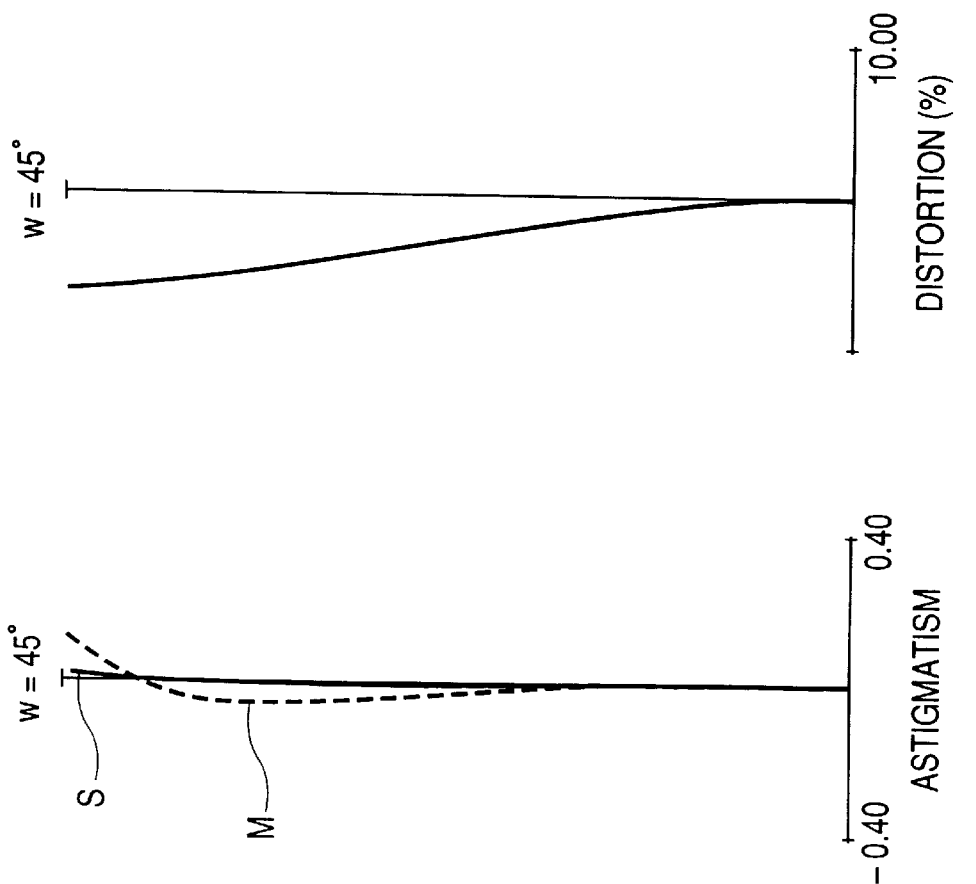
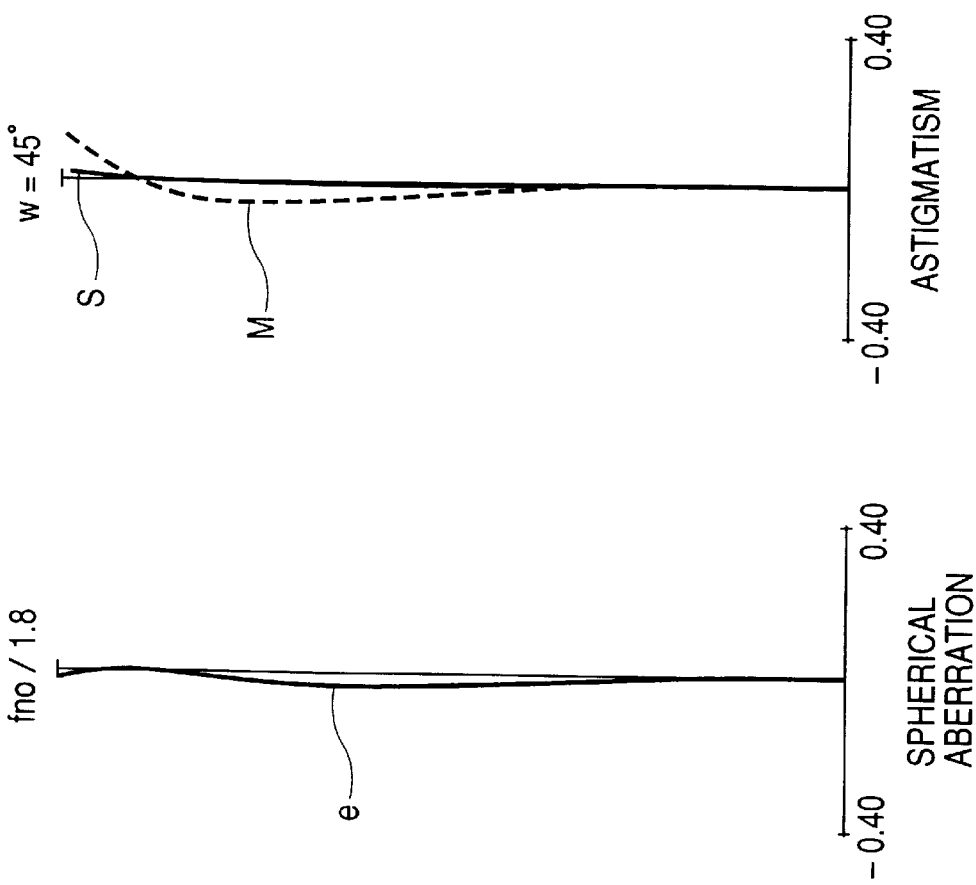

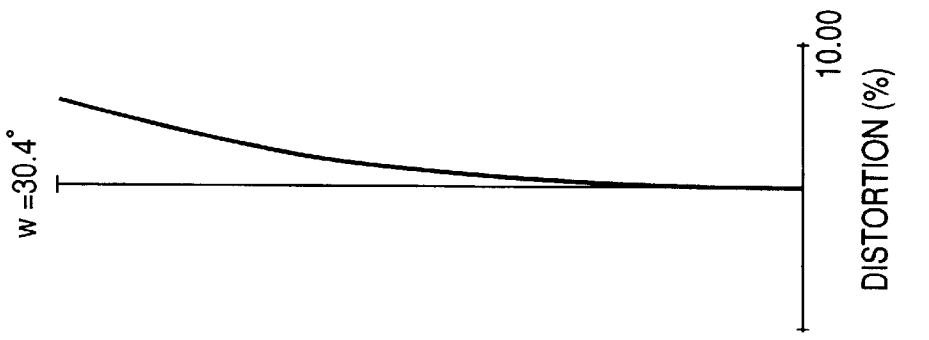
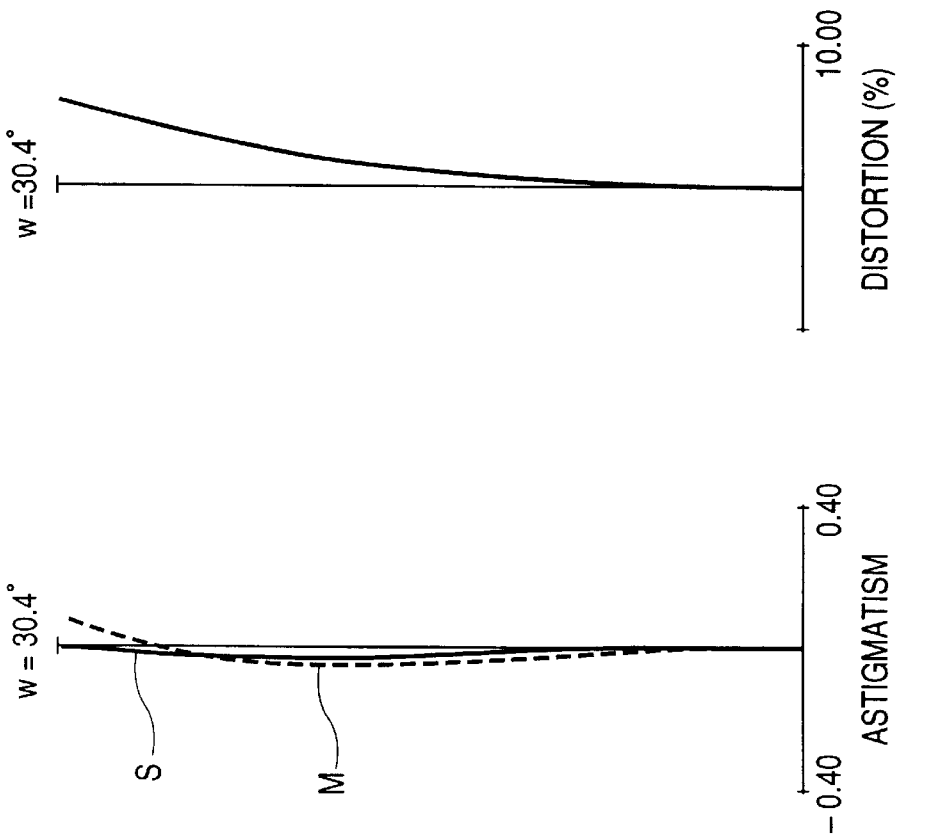
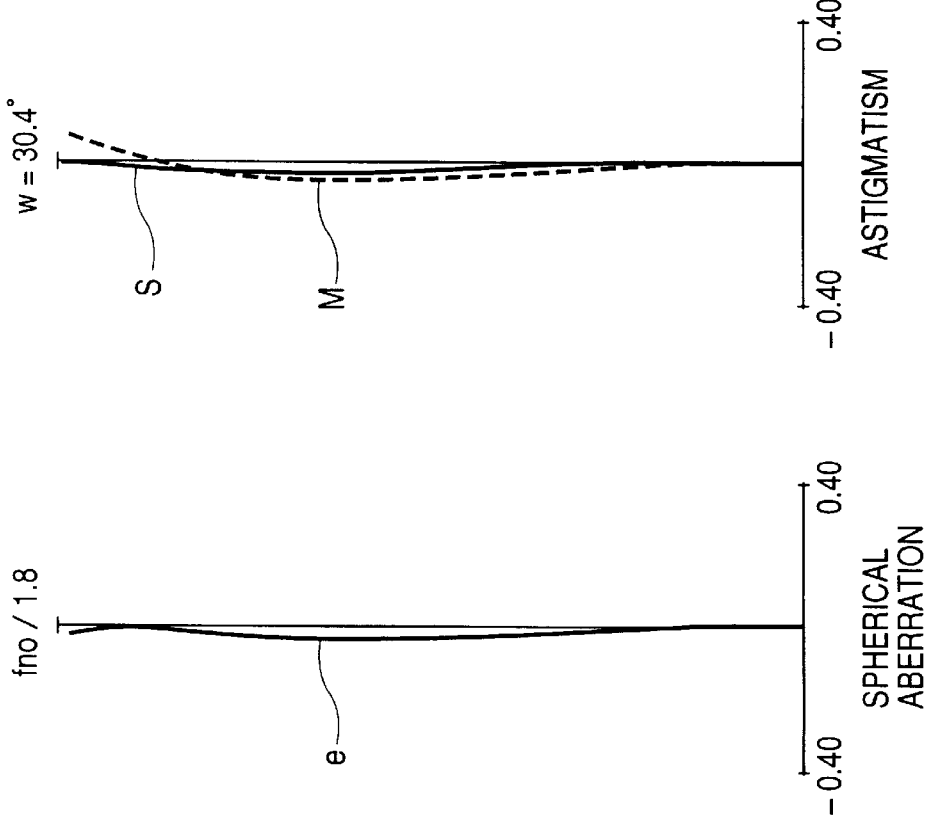

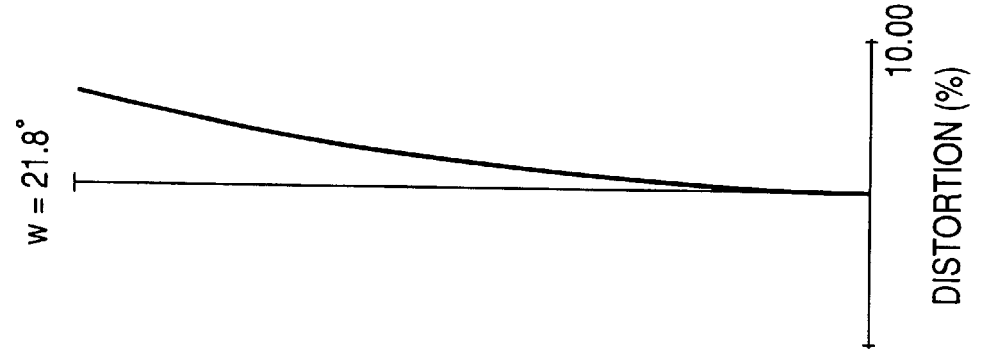
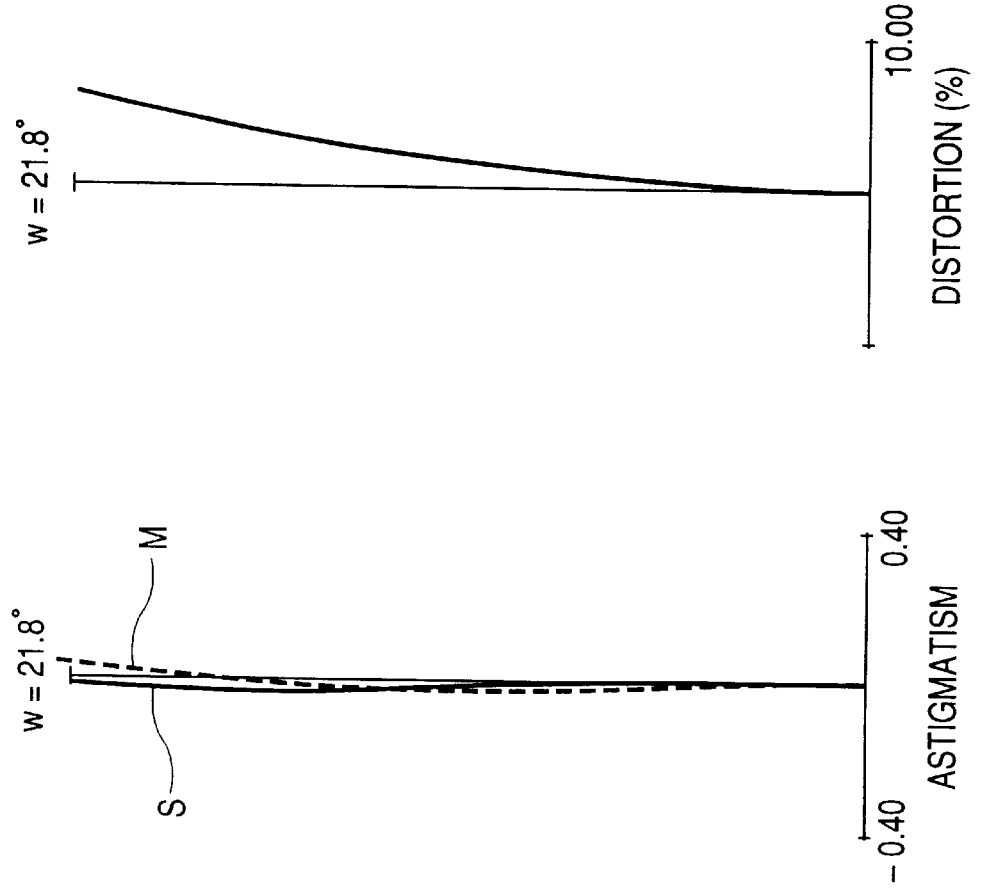
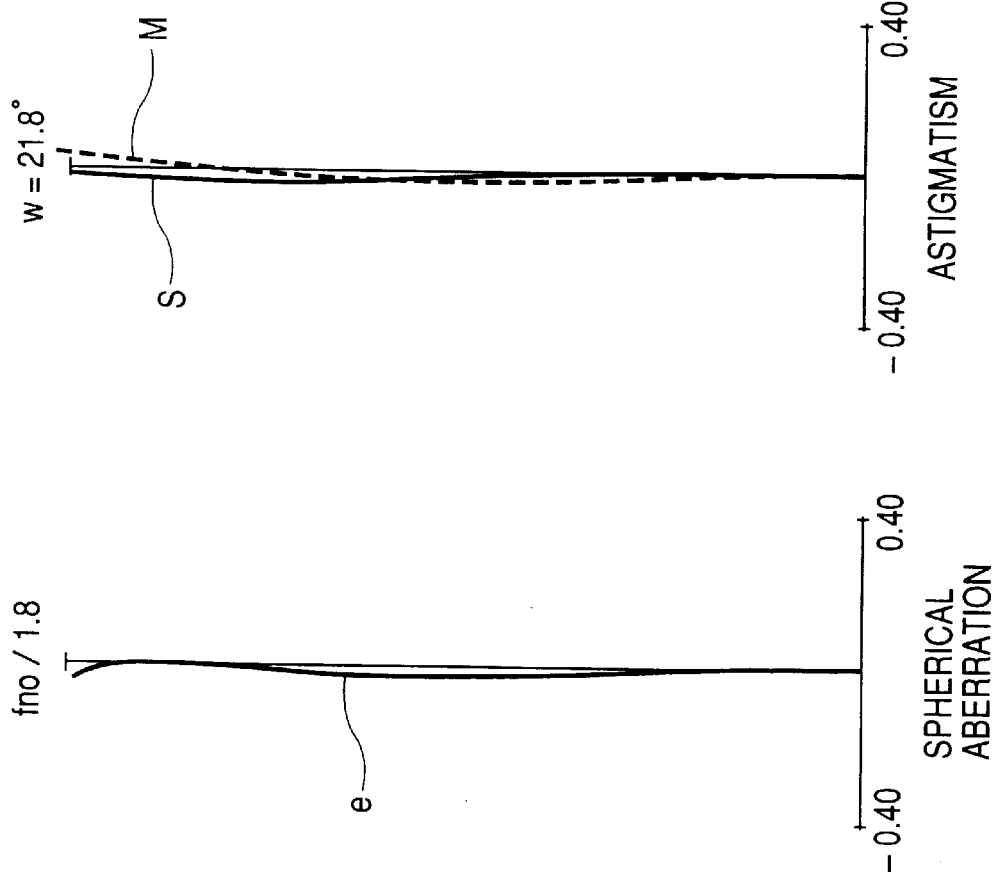

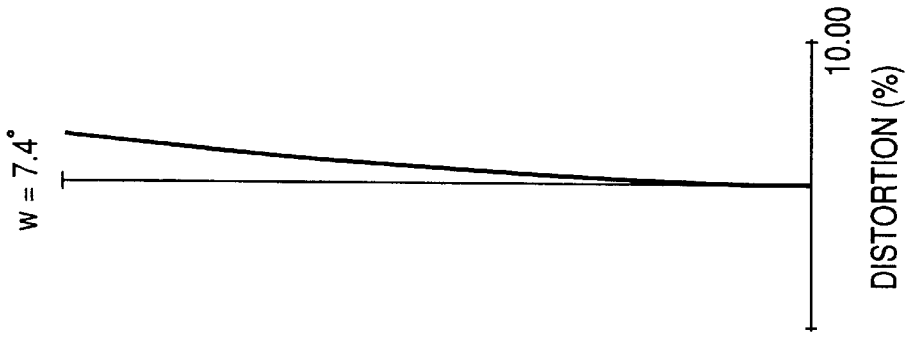
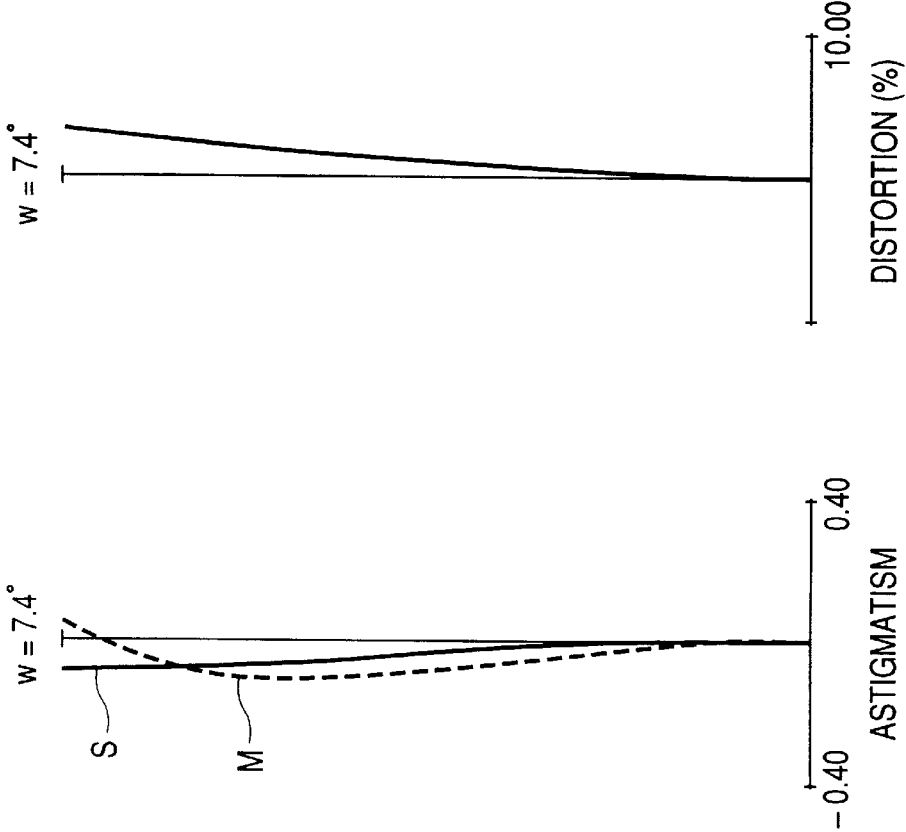
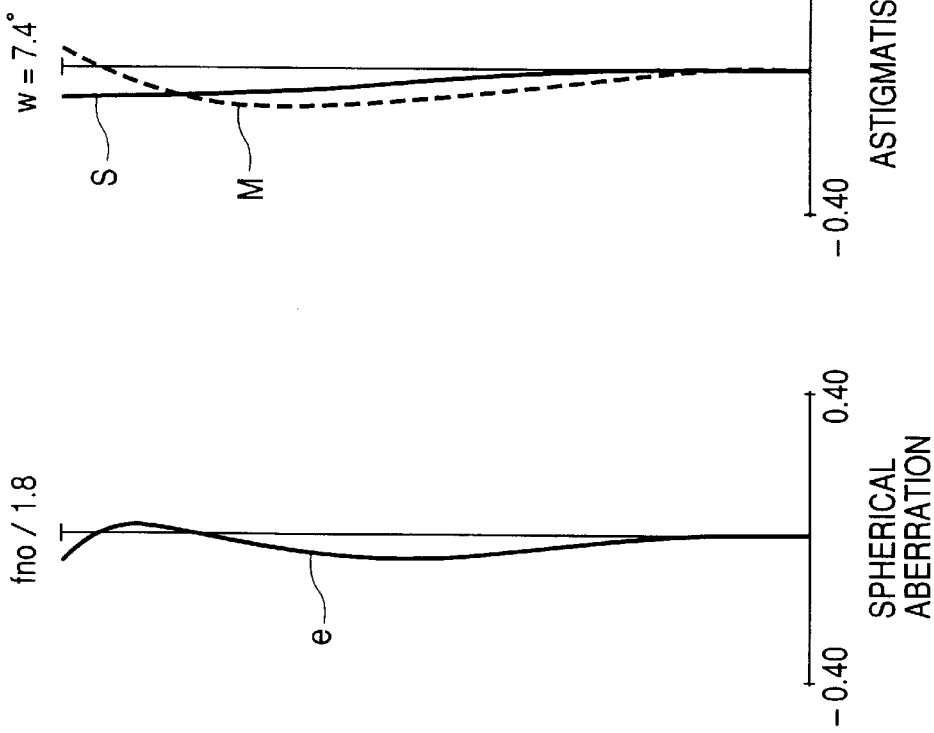

FIG. 9C
FIG. 9B
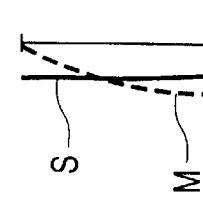
FIG. 9A

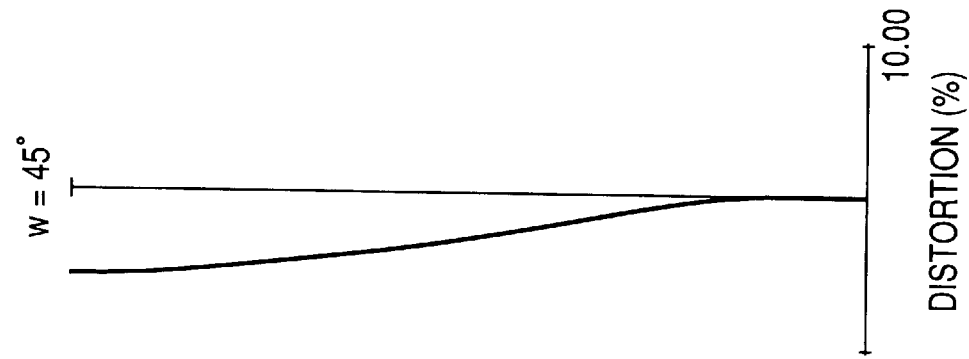
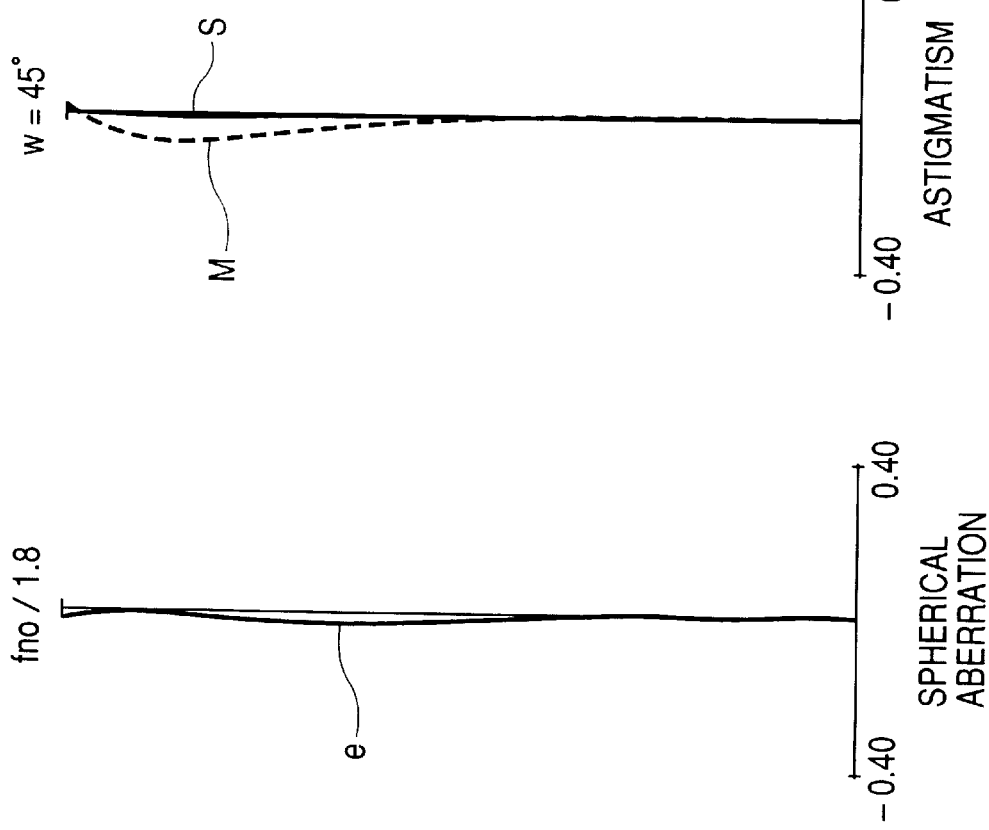

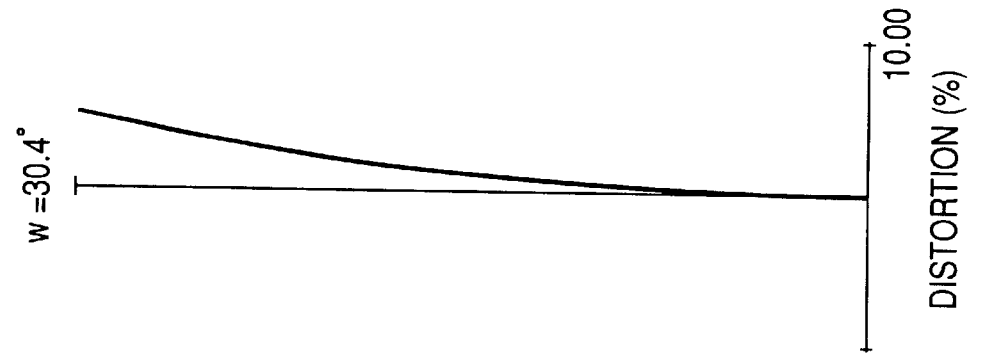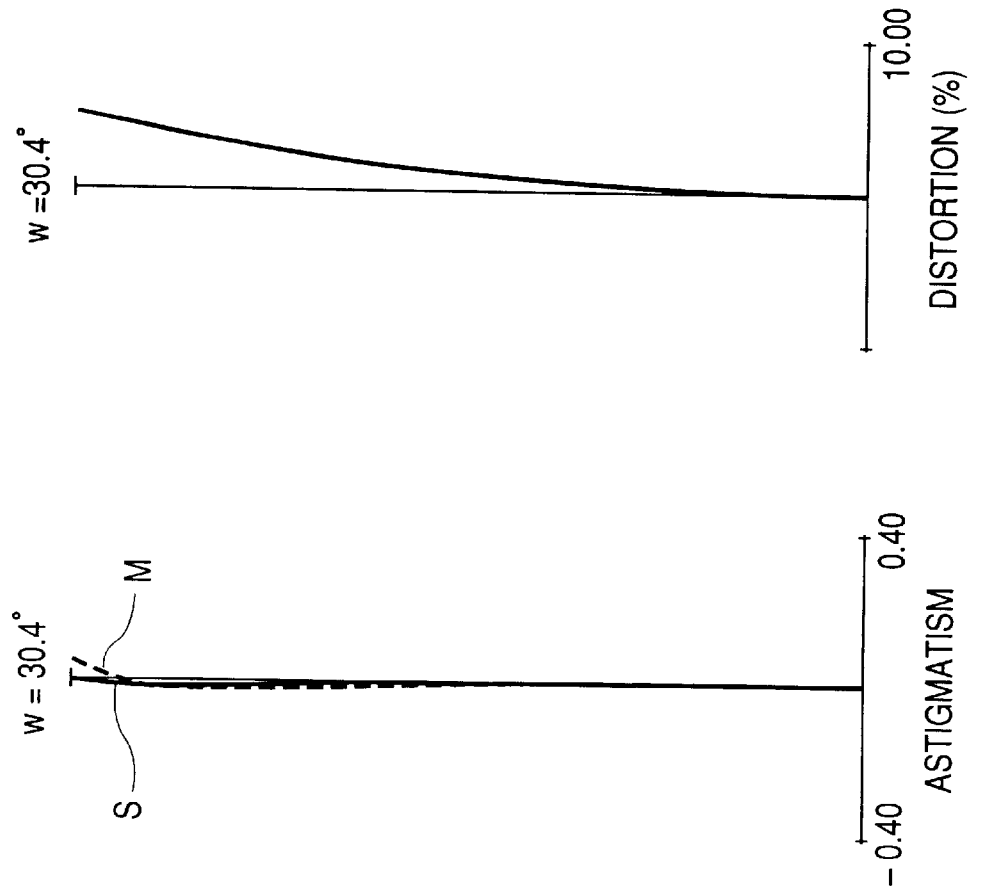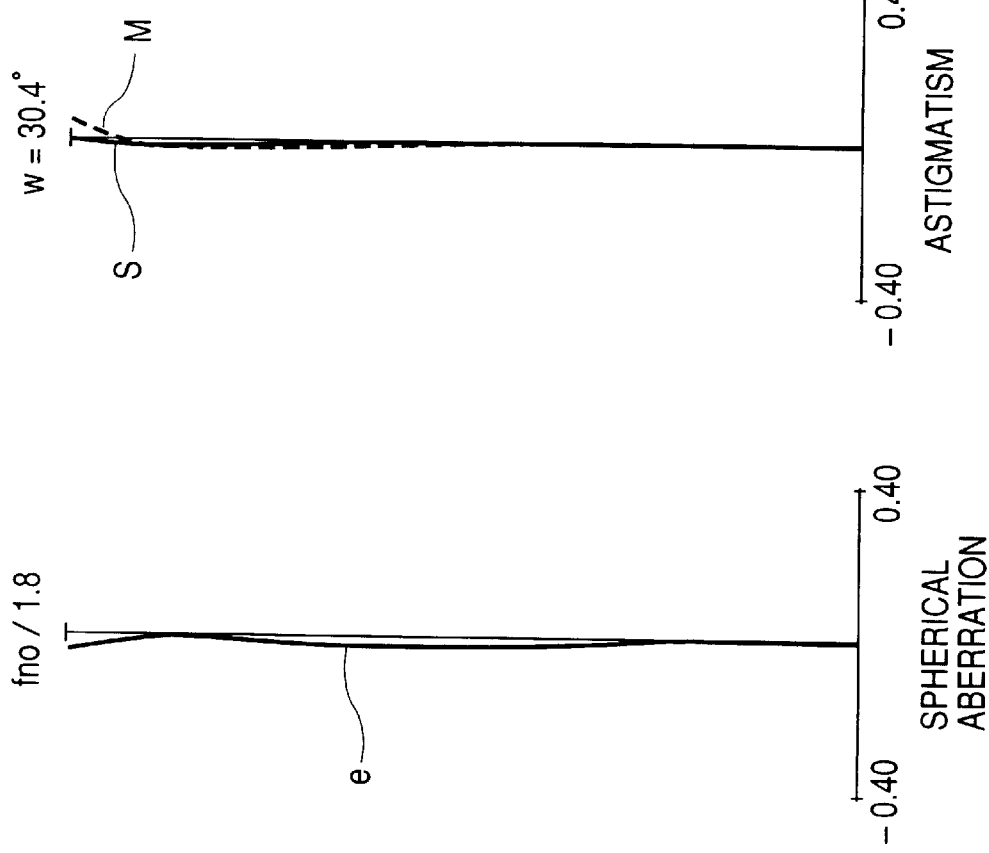

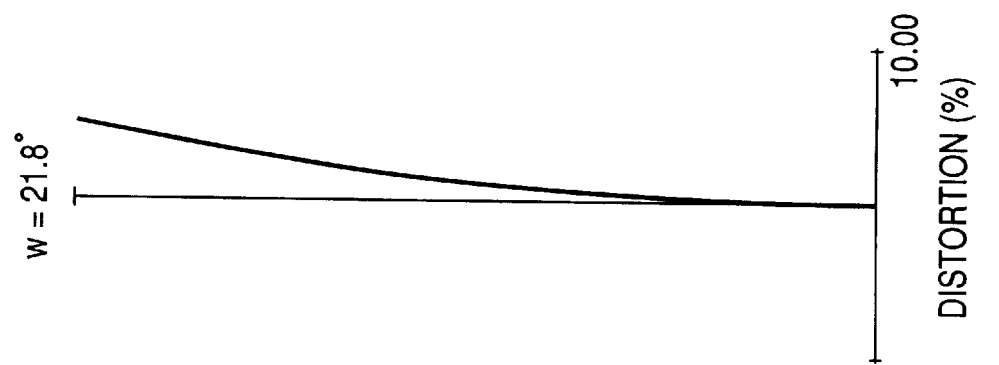
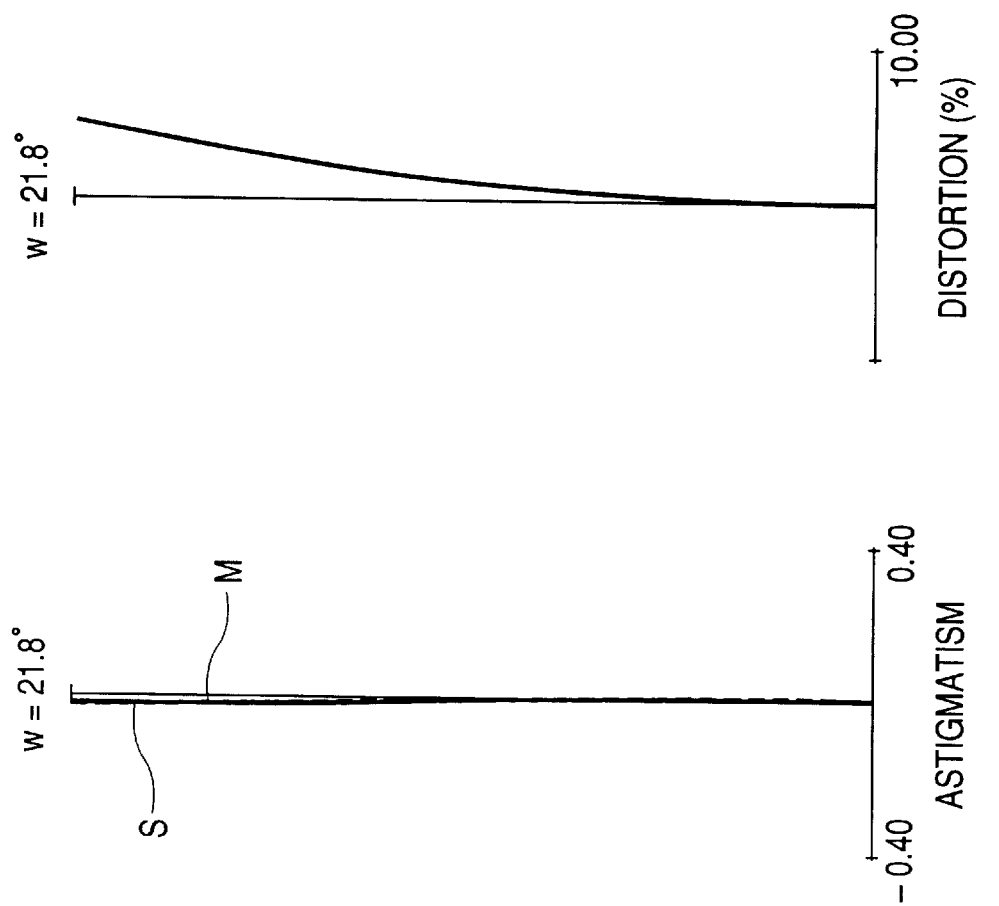
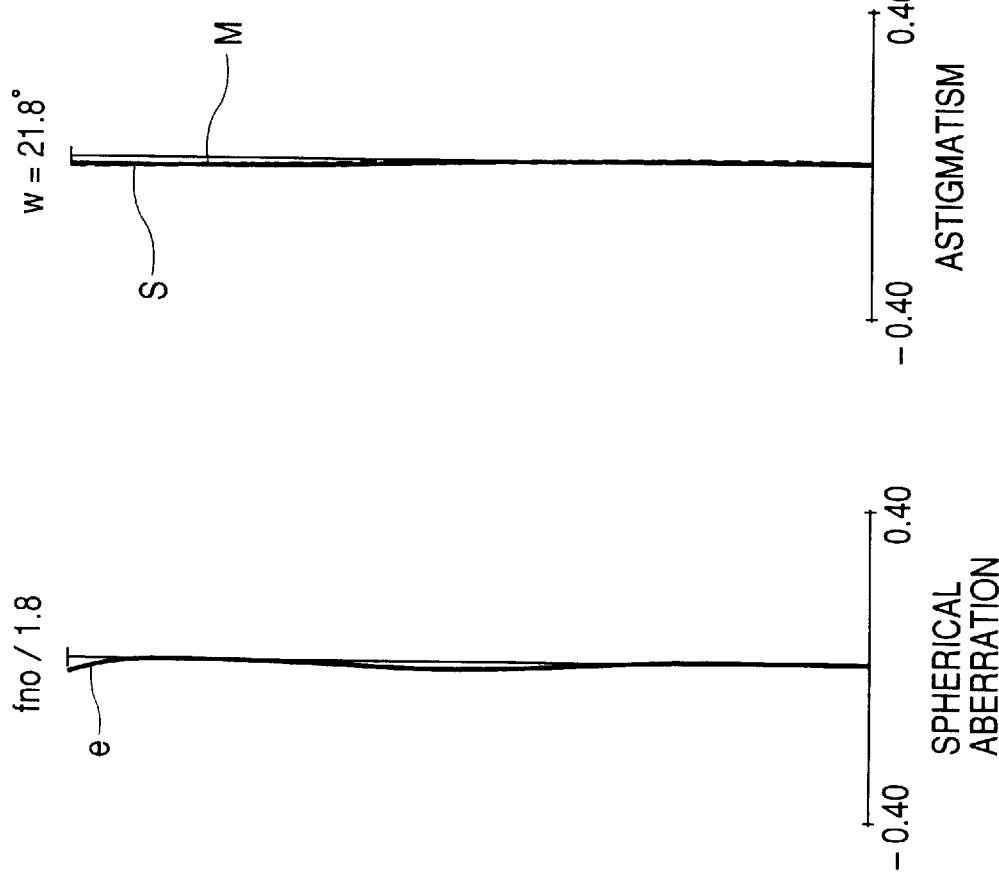

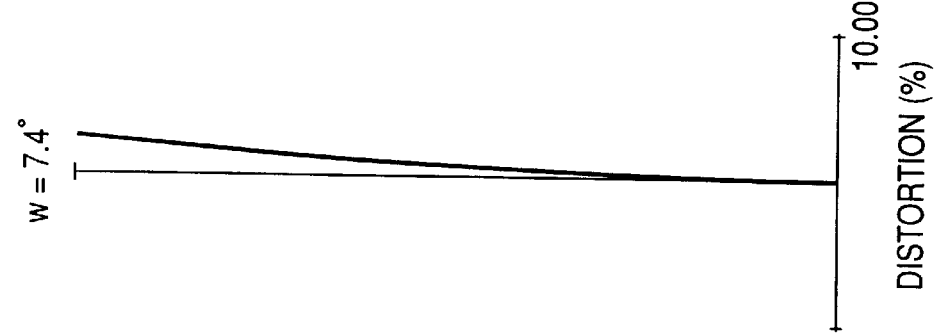
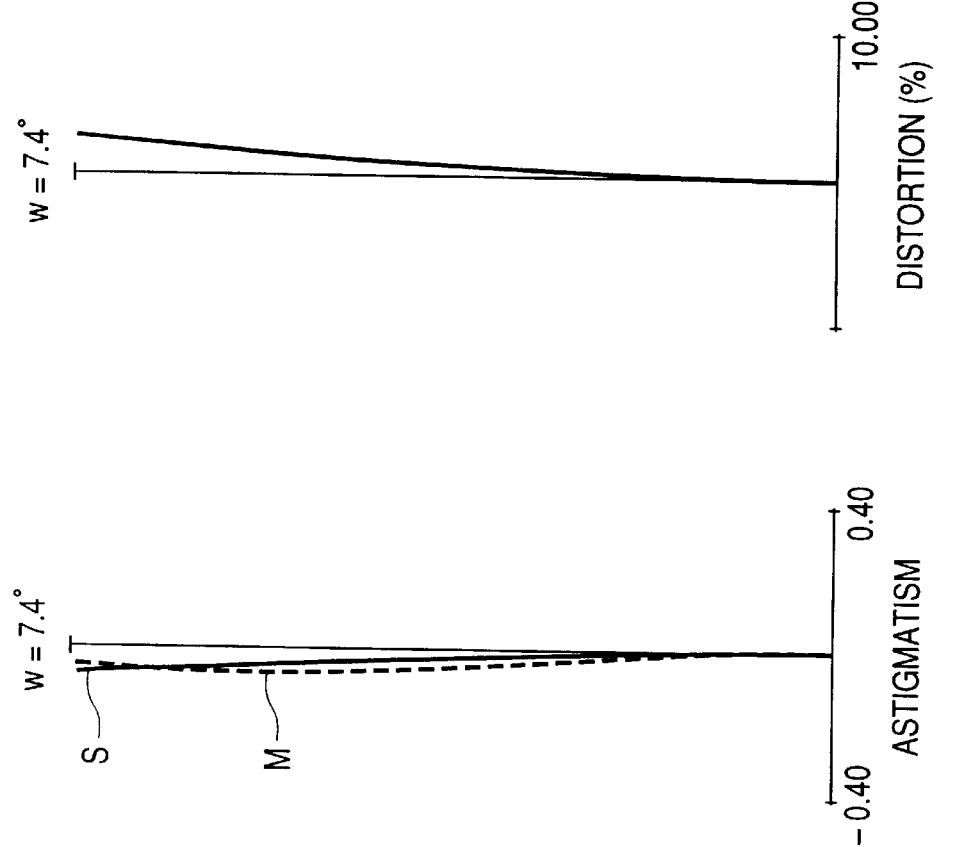
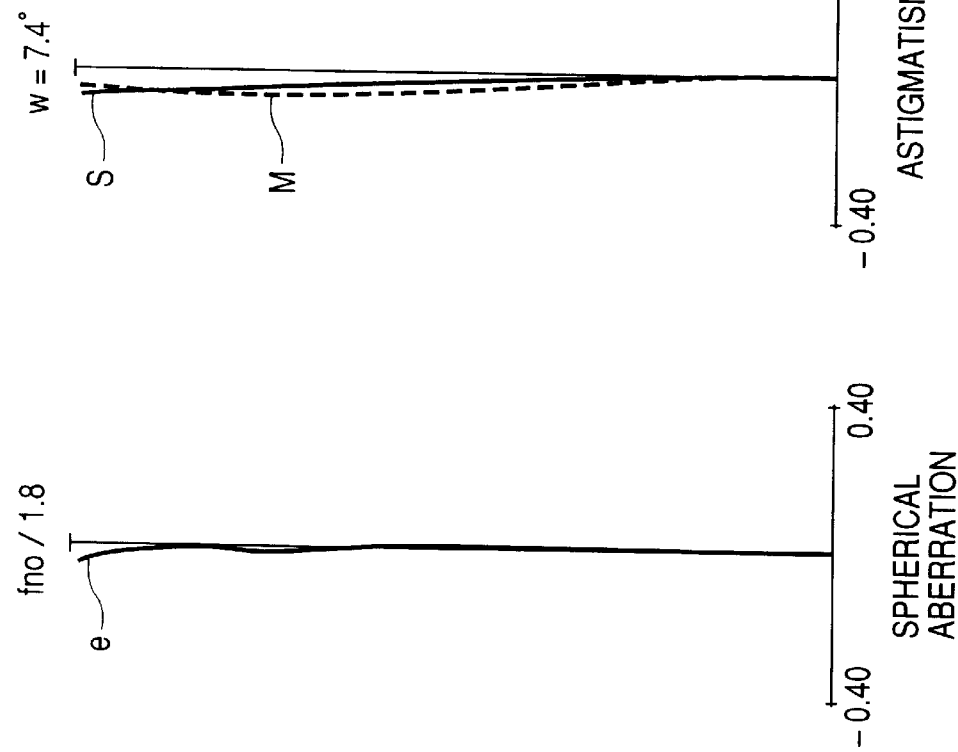

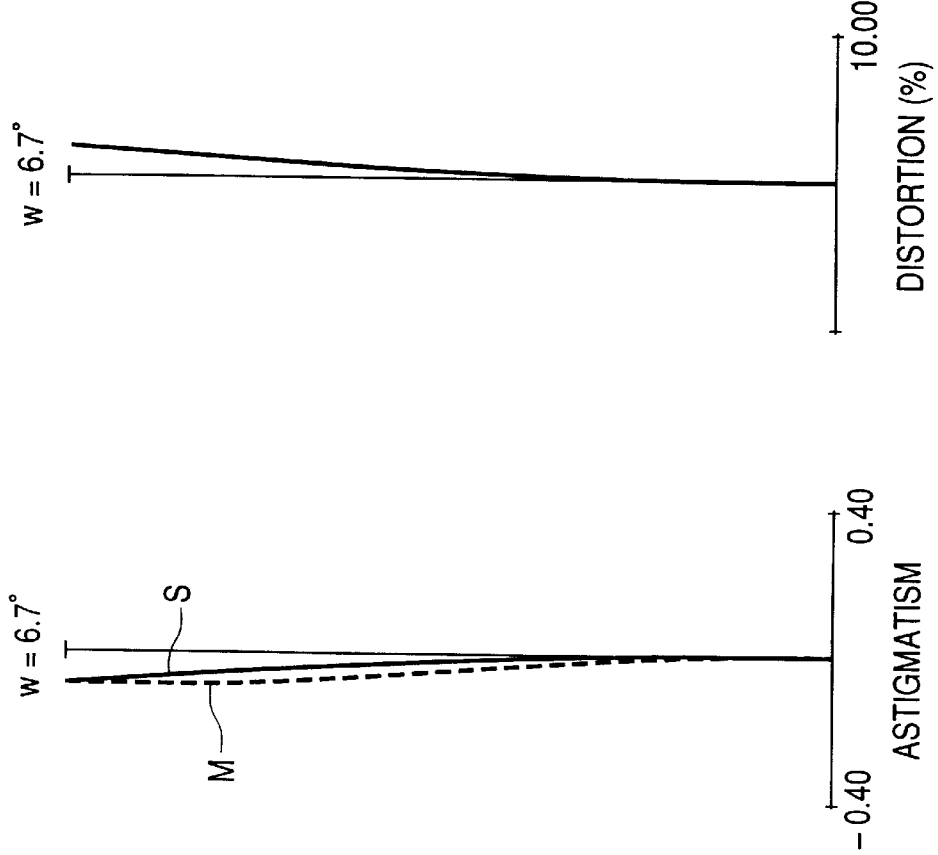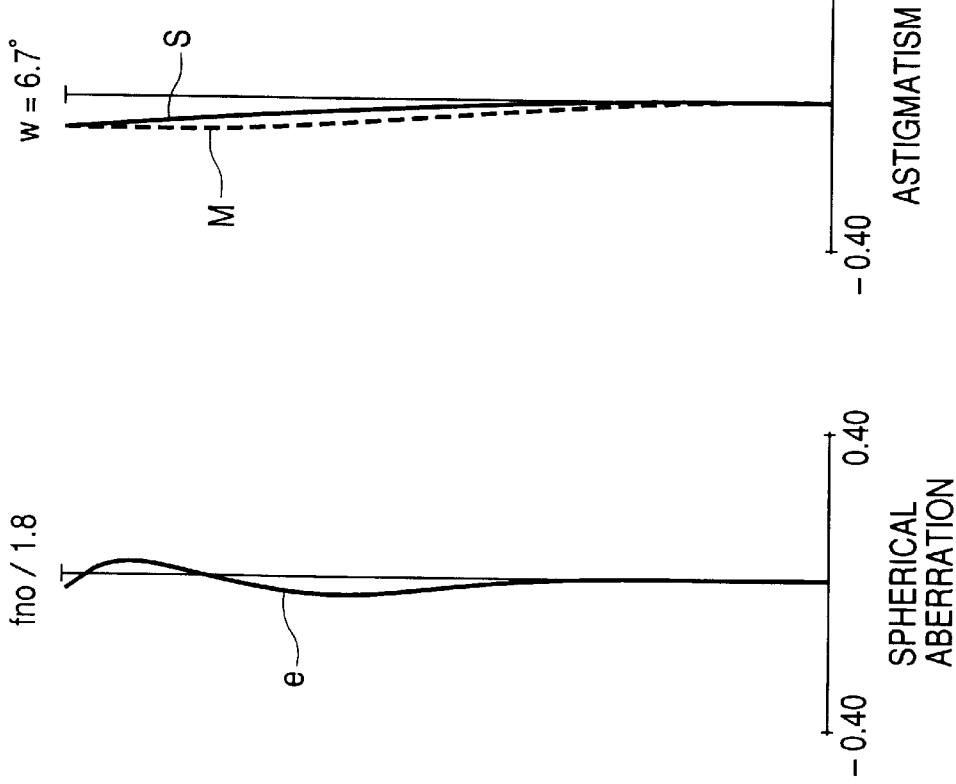

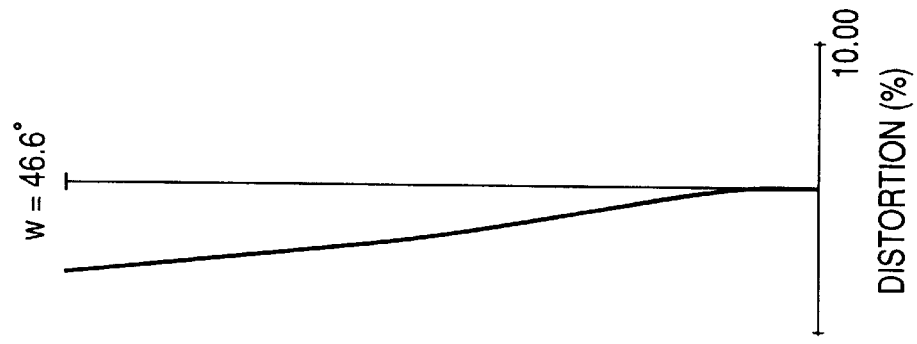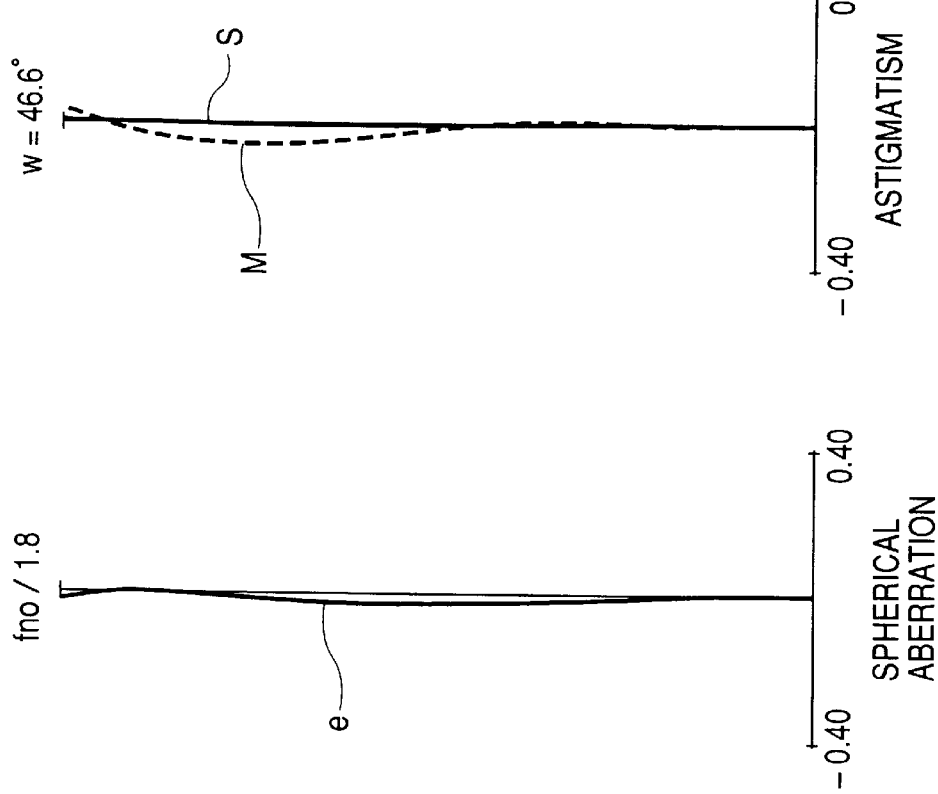

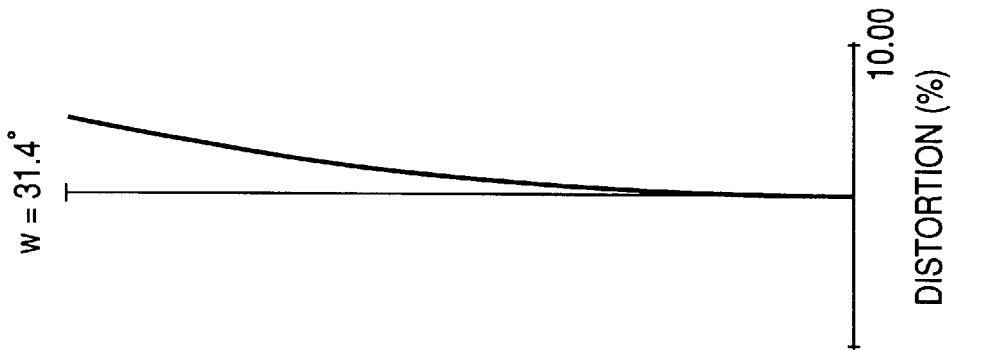
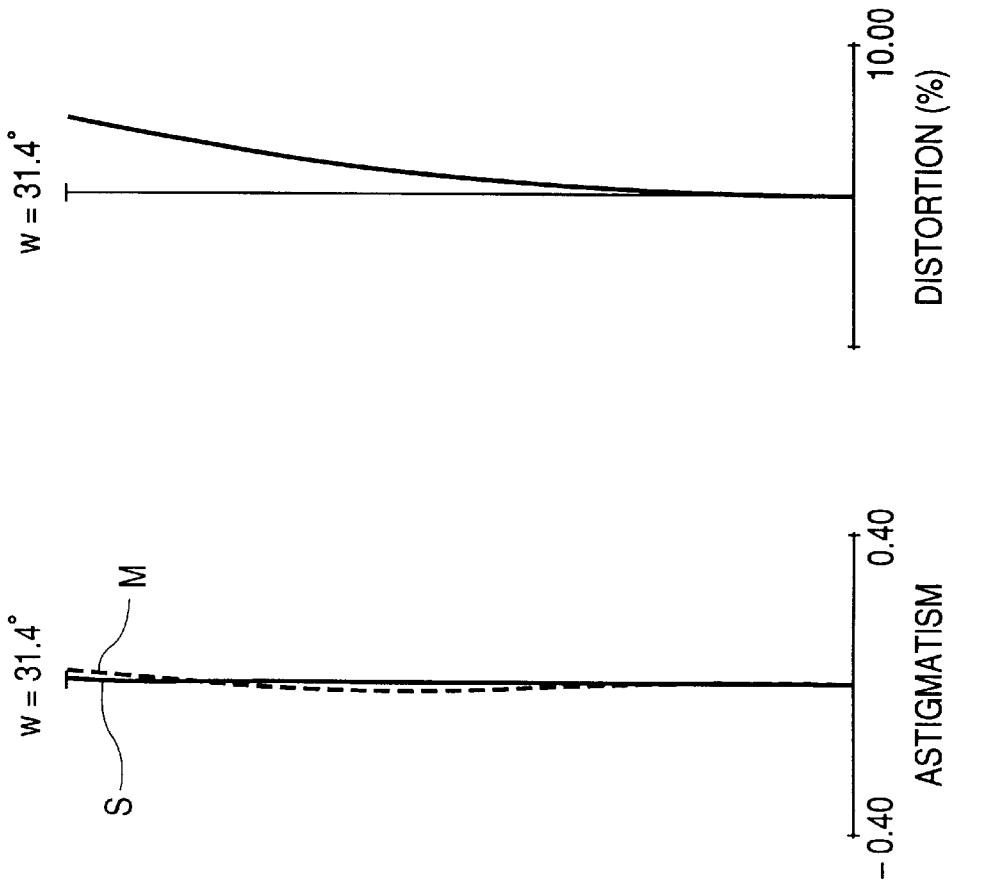
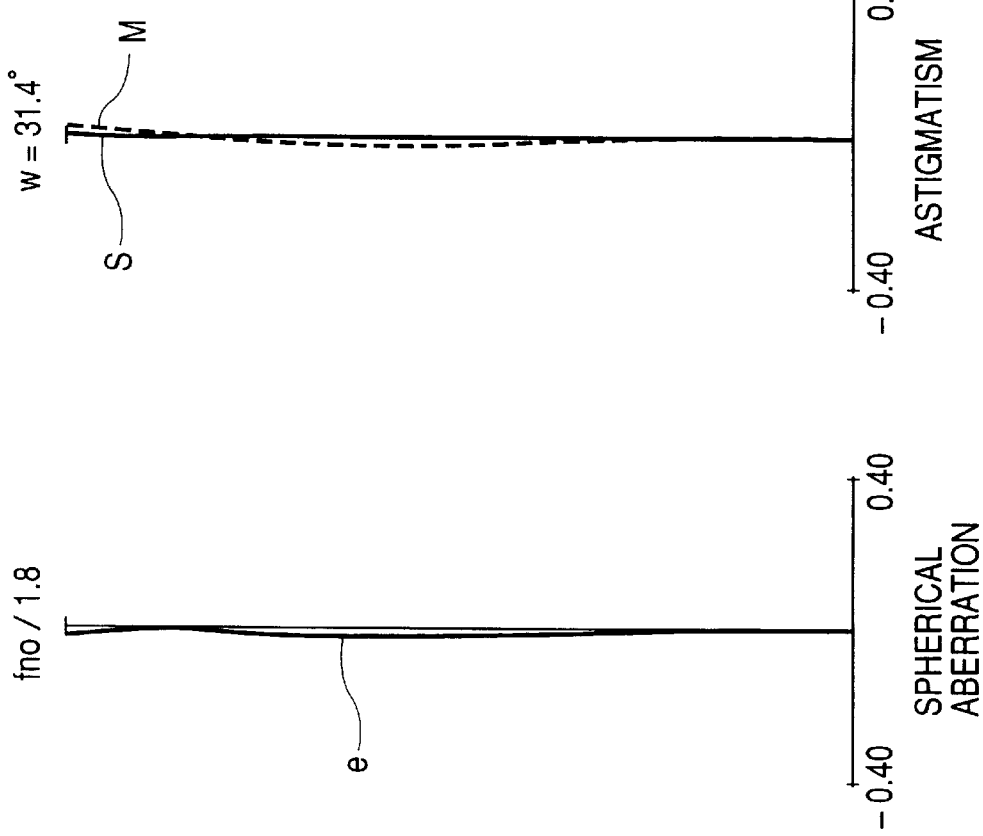

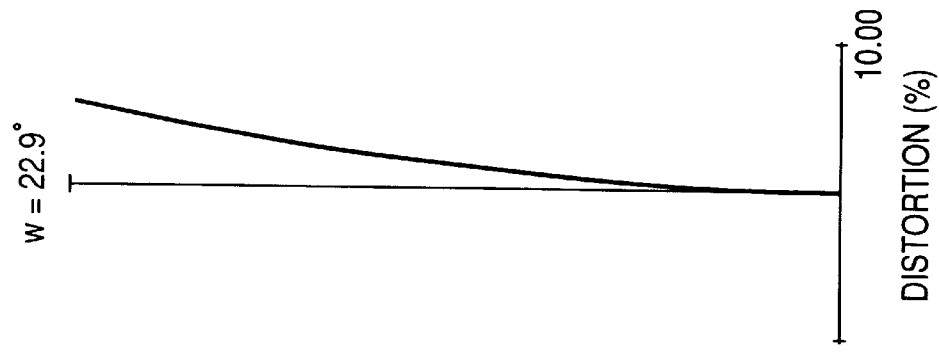
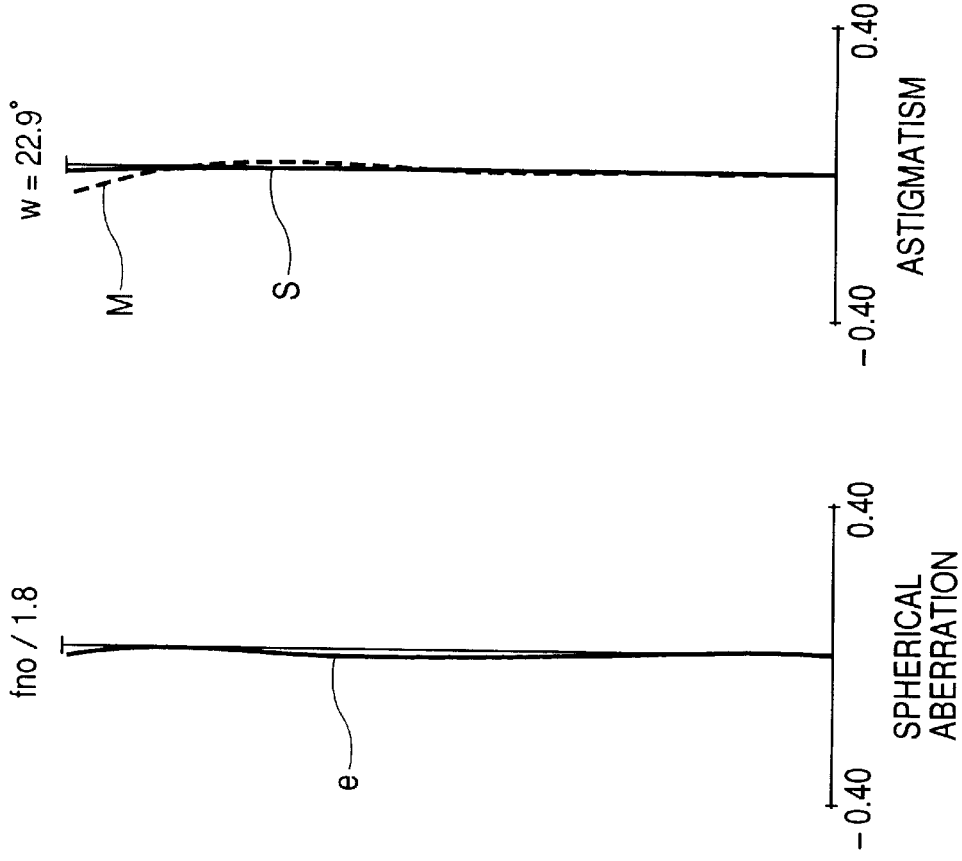

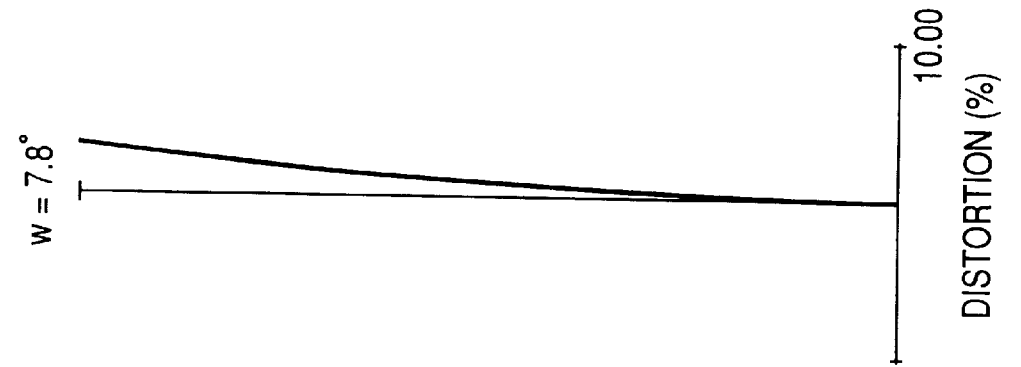
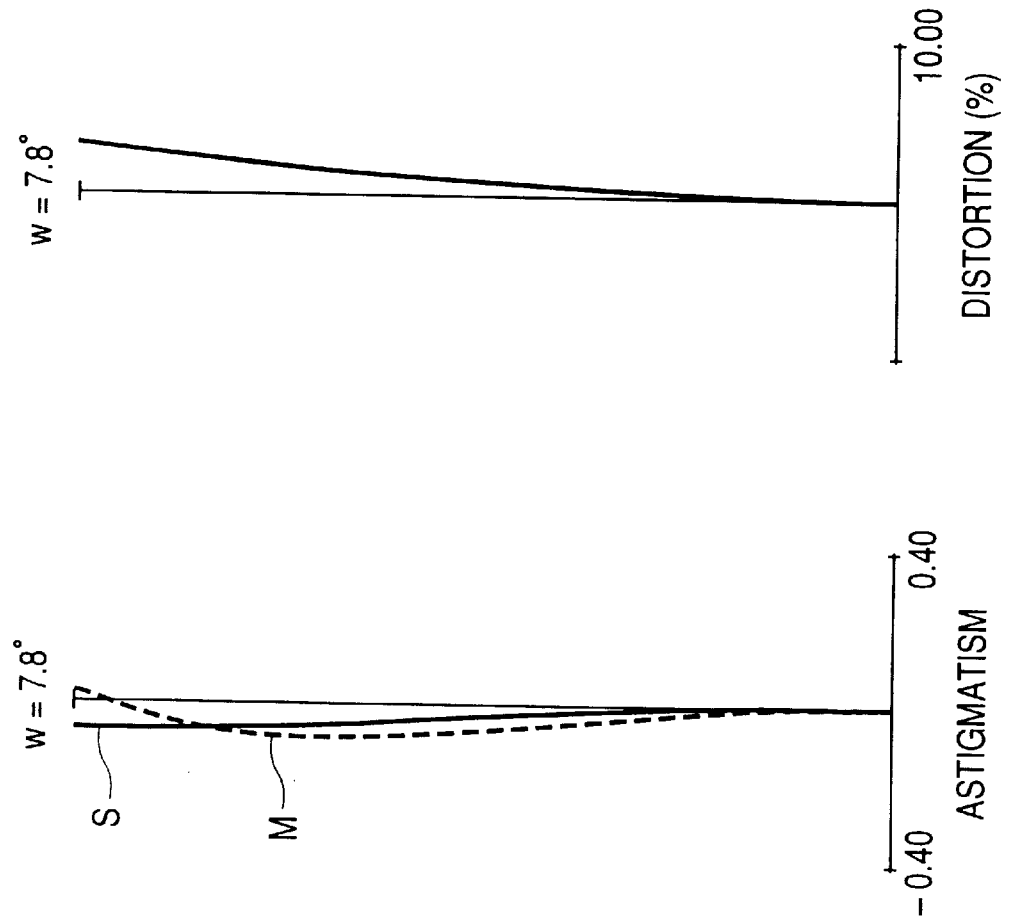
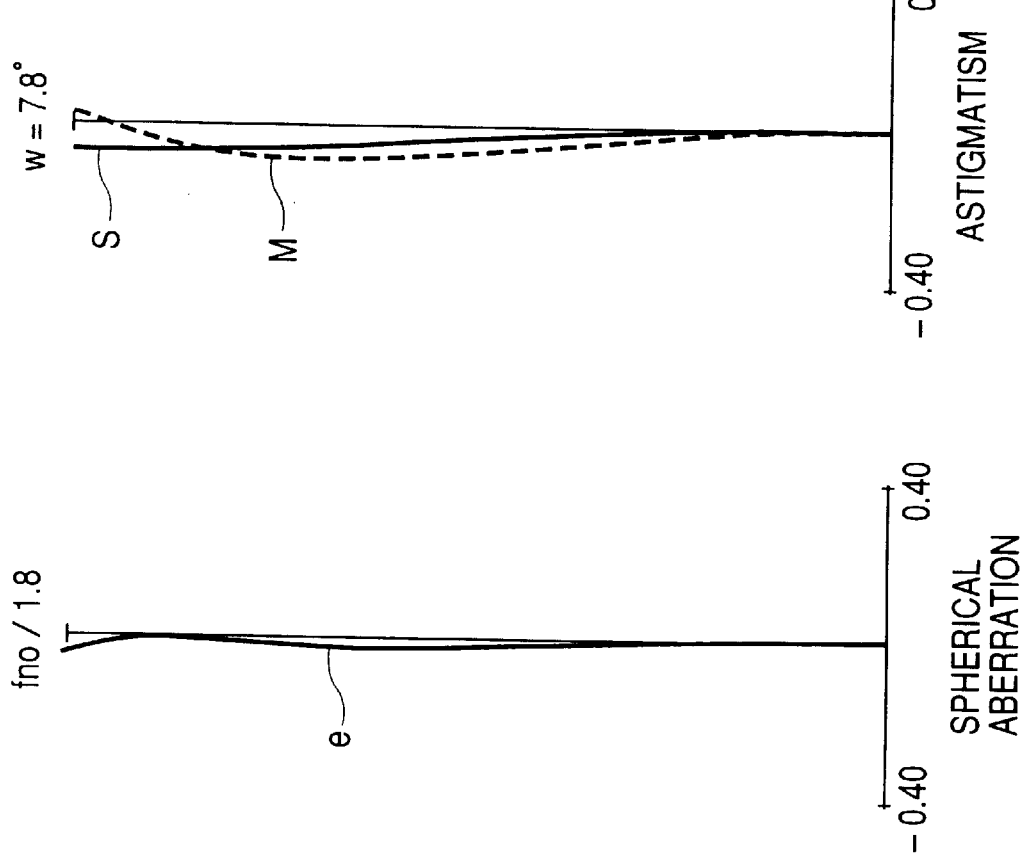

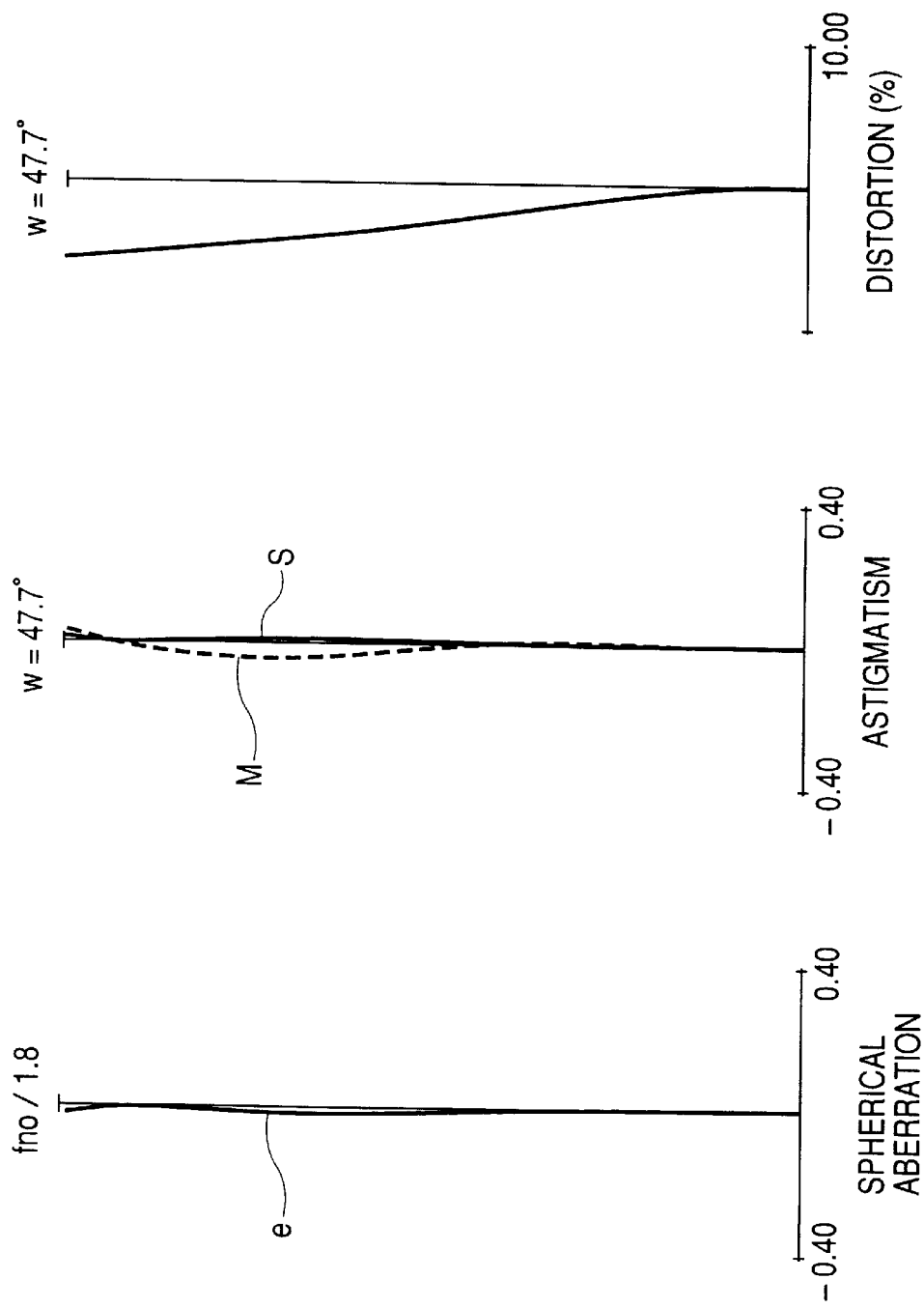

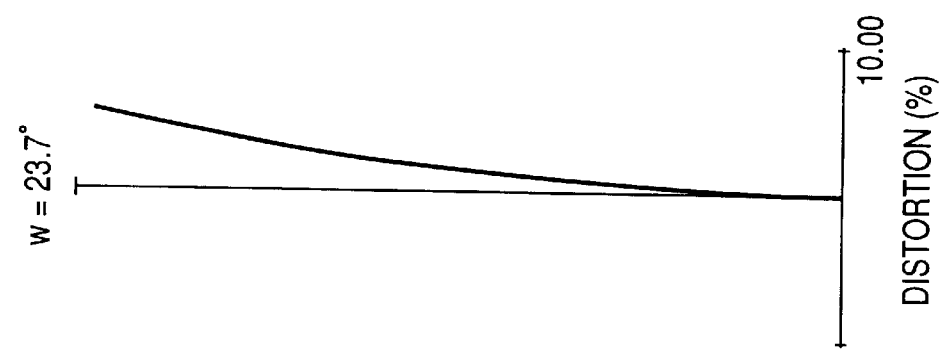
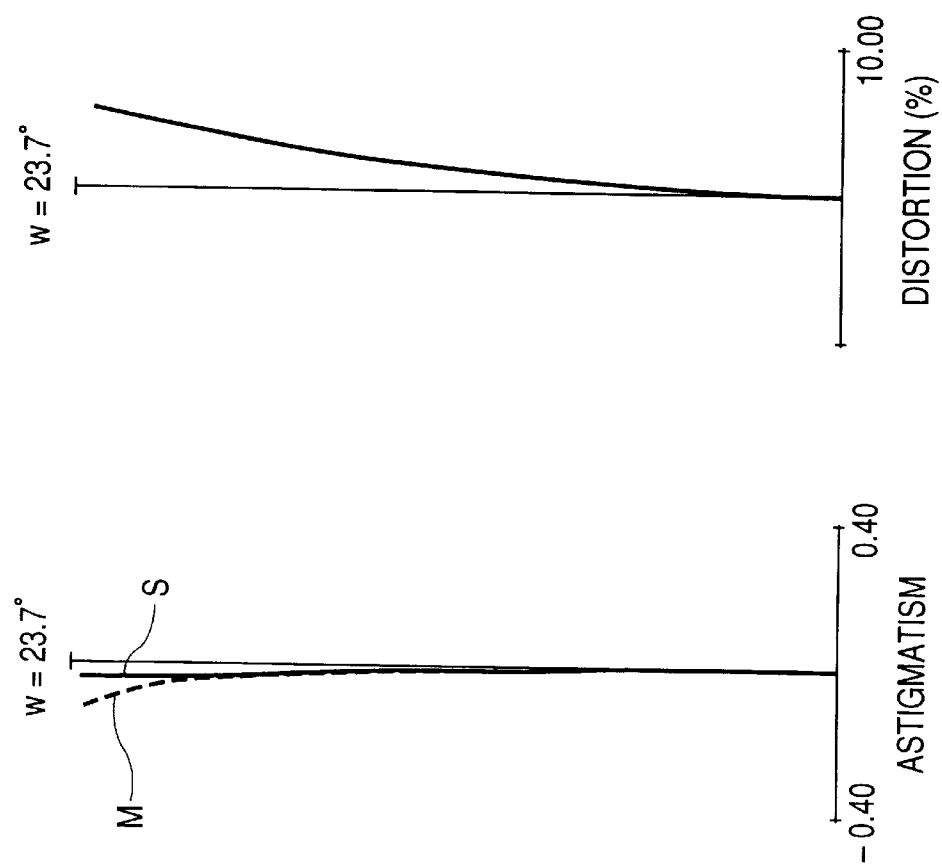
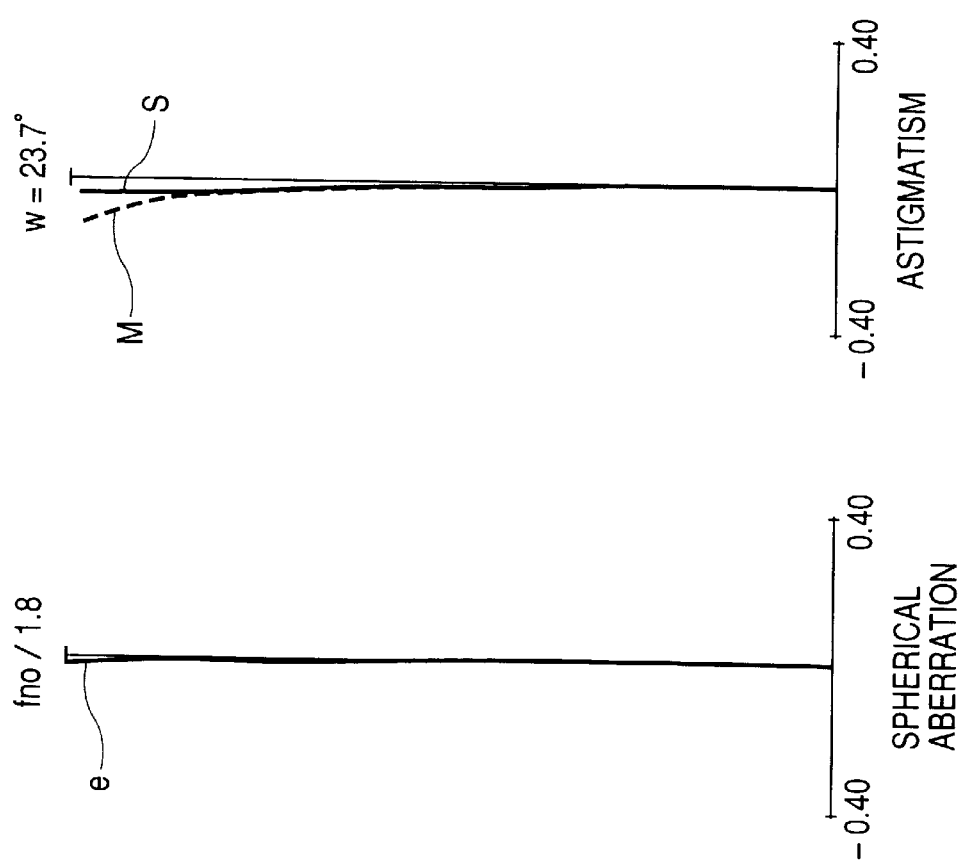

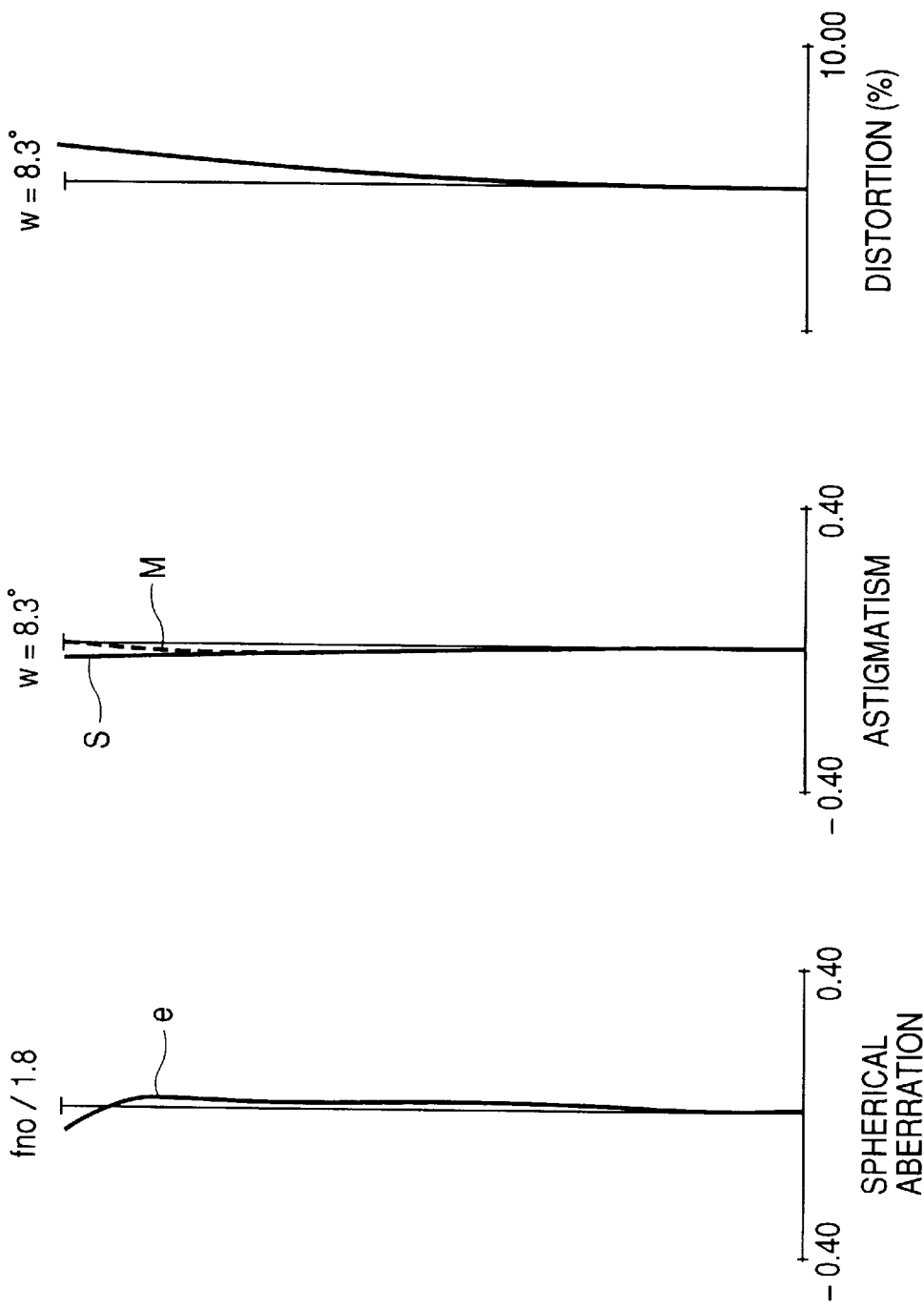

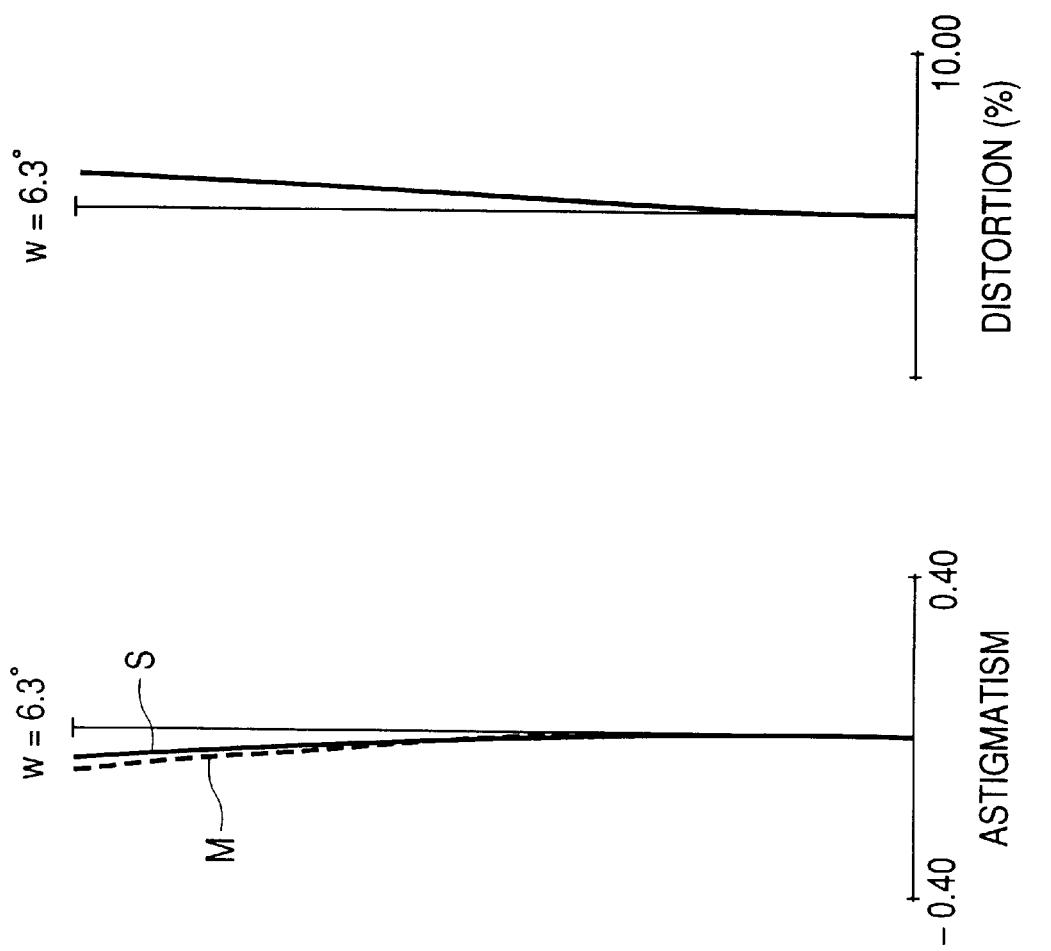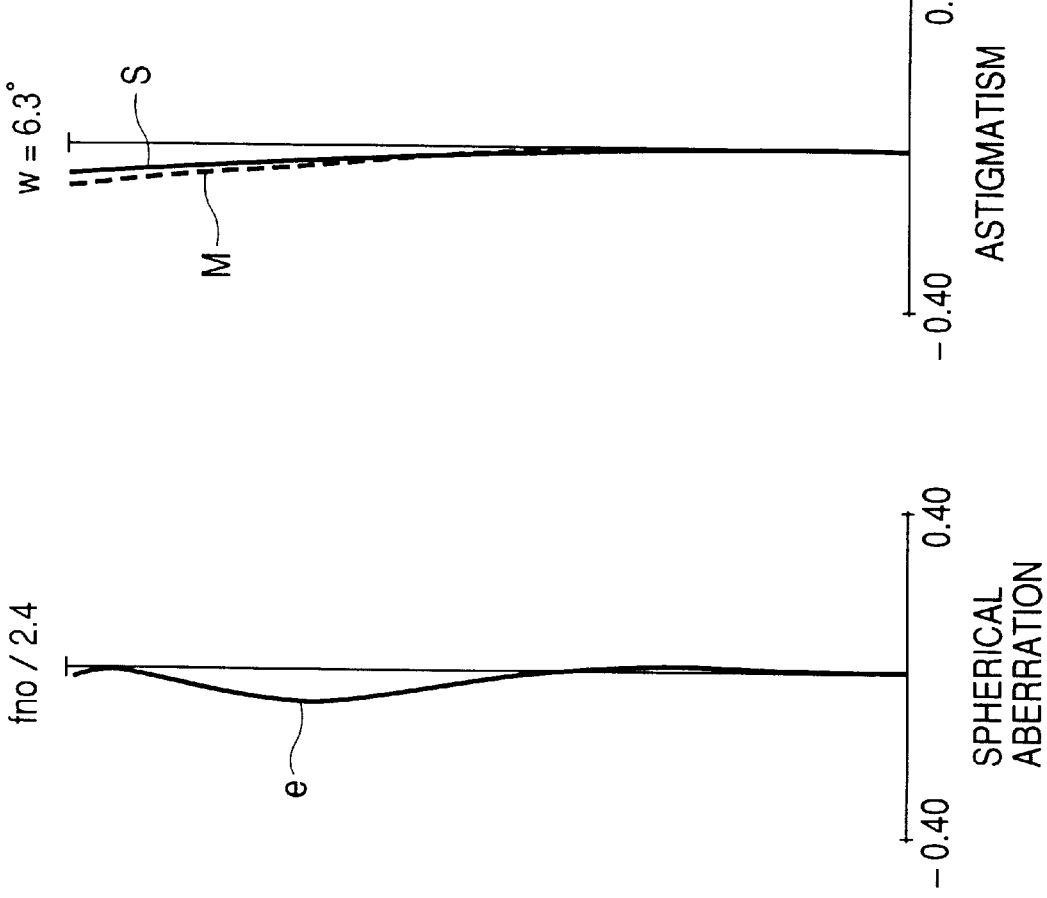

ft (TELEPHOTO END)

ZOOM LENS

BACKGROUND OF THE INVENTION

1. Field of the Invention

This invention relates to a zoom lens, and particularly to a zoom lens suitable for a television camera, a phototaking camera, a video camera, etc. which appropriately uses an aspherical surface in a portion of a lens system, which has a large aperture in which the F number at the wide angle end is of the order of 1.7 and moreover has a wide angle (wide angle end angle of view $2\overline{\omega}=58°$ to 70°) and good optical performance over the entire variable power range of as high a variable power ratio as a variable power ratio of the order of 8.5 to 10.

2. Related Background Art

Zoom lenses having a large aperture, high variable power and high optical performance have heretofore been required for television cameras, phototaking cameras, video cameras, etc.

In addition, particularly in color television cameras for broadcasting, great importance has been attached to operability and mobility and in compliance with such requirements, compact CCD's (solid state image pickup devices) of ⅔ inch and ½ inch have become the mainstream among image pickup devices.

These CCD's have substantially uniform resolving power over the entire image pickup range and therefore, it has been required of zoom lenses using these that resolving power be substantially uniform from the center of the image field to the periphery of the image field.

For example, it is desired that various aberrations such as astigmatism, distortion and chromatic difference of magnification be corrected and the entire image field has high optical performance. It is further desired that the zoom lenses have a large aperture, a wide angle and a high variable power ratio and moreover be compact and light in weight and have a long back focus for disposing a color resolving optical system and various filters in front of image pickup means.

Among zoom lenses, so-called four-unit zoom lenses comprising, in succession from the object side, a first lens unit of positive refractive power for focusing, a second lens unit of negative refractive power for focal length change, a third lens unit of positive or negative refractive power for correcting the movement of an image plane fluctuating with a focal length change, and a fourth lens unit of positive refractive power performing chiefly the imaging action are often used as zoom lenses for color television cameras for broadcasting stations.

Among the zoom lenses of such four-unit construction, a four-unit zoom lens having F number of the order of 1.7, a wide angle end angle of view $2\overline{\omega}=86°$, a great aperture ratio and high variable power of a variable power ratio of the order of 8 is proposed, for example, in Japanese Laid-Open Patent Application No. 6-242378.

In a zoom lens, to obtain a great aperture ratio (F number 1.7 to 1.8), a high variable power ratio (variable power ratio 8.5 to 10), a super-wide angle (wide angle end angle of view $2\overline{\omega}=90°$ to 96°) and moreover high optical performance over the entire variable power range, it is necessary to appropriately set the refractive power and lens construction of each lens unit.

Generally, to obtain a small aberration fluctuation and high optical performance over the entire variable power range, it becomes necessary, for example, to increase the number of lenses in each lens unit and increase the degree of freedom of design in aberration correction.

If for this purpose, an attempt is made to achieve a zoom lens of a great aperture ratio, a super-wide angle and a high variable power ratio, the number of lenses will unavoidably be increased, and this leads to the arising of the problem that the entire lens system becomes bulky, and it becomes impossible to comply with the desire for compactness and lighter weight.

Also, in the imaging performance, first speaking regarding the super-wide angle of a zoom lens, distortion poses the greatest problem. This is because distortion influences by the cube of the angle of view in the area of the third-order aberration coefficient.

As shown in FIG. 29 of the accompanying drawings, distortion is considerably greater under (minus) at the wide angle end (focal length fw). From the wide angle end fw toward the telephoto end (focal length ft), distortion becomes gradually greater in the direction of over (plus) and passes a zoom position at which distortion is 0, and the value of over tends to become greatest near the zoom position $fm=fw \times Z^{1/4}$. From the focal length fm to the telephoto end ft, the over amount becomes gradually smaller. In the foregoing, fw is the focal length at the wide angle end, and Z is a zoom ratio.

This tendency comes to remarkably present itself as the angle of view at the wide angle end becomes greater. In such a super-wide angle zoom lens wherein the wide angle end angle of view $2\overline{\omega}$ exceeds 90°, distortion of under on the wide angle side is created and the correction of this distortion becomes very difficult.

Next, the changing of a point at which the image contrast of the center of the image field is best, i.e., the so-called best imaging plane, resulting from a focal length change, poses a problem. This is attributable chiefly to the changing of spherical aberration resulting from a focal length change. This spherical aberration influences by the cube of the aperture in the area of the third-order aberration coefficient and therefore, it is the greatest problem in providing a large aperture.

Generally, the changing of spherical aberration resulting from a focal length change tends to be under (minus) with respect to the Gaussian imaging plane from the wide angle end at which spherical aberration is 0 to the vicinity of the zoom position $fm=fw \times Z^{1/4}$ as shown in FIG. 30 of the accompanying drawings when the zoom ratio is Z and the focal length at the wide angle end is fw. When the vicinity of the zoom position $fm=fw \times Z^{1/4}$ is passed, the under amount becomes smaller and becomes 0 at a certain zoom position, and now tends to become over (plus).

It becomes most over (plus) near a zoom position $fd=(Fno.w/Fno.t) \times ft$ at which F drop in which F number becomes great (the lens system becomes dark) begins, and when this zoom position is passed, the over amount becomes smaller to the telephoto end and becomes substantially 0 at the telephoto end.

In the foregoing, Fno.w and Fno.t are F numbers at the wide angle end and the telephoto end, respectively, and ft is the focal length at the telephoto end.

As described above, particularly in a zoom lens having a position at which F drop begins, the correction of spherical aberration on the telephoto side becomes very difficult.

In order to correct such changing of various aberrations effectively over the entire variable power range, the number of lenses in the focusing lens unit and the lens unit of the focal length changing system has heretofore been increased. Such a technique, however, gives rise to a new problem that the entire lens system becomes bulky and complicated.

Also, the introduction of an aspherical surface for the solution of such a problem is done in an embodiment disclosed in the above-mentioned Japanese Laid-Open Patent Application No. 6-242378.

However, the specification of zoom lenses has been improved, and in a zoom lens of a great aperture ratio and moreover, a high variable power ratio beginning from a super-wide angle, the reconsideration of the method of introducing the aspherical surface has become necessary.

In a zoom lens of a great aperture ratio and moreover a high variable power ratio beginning from a super-wide angle, distortion changes greatly on the wide angle side and spherical aberration changes greatly on the telephoto side. It has become difficult to correct these two aberrations efficiently and well simply by introducing an aspherical surface into one of the surfaces of a focal length changing portion.

SUMMARY OF THE INVENTION

The present invention has as its first object the provision of a so-called four-unit zoom lens in which the refractive power of each lens unit is appropriately set and at least one lens surface in a fore lens unit is made into an aspherical surface to thereby reduce the changing of various aberrations resulting from a focal length change and particularly distortion on the wide angle side and spherical aberration on the telephoto side is effectively corrected. The present invention has as its second object the provision of a zoom lens which has high optical performance over the entire variable power range and in which F number at the wide angle end is of the order of 1.8 and which has a super-wide angle (for example, the angle of view at the wide angle end is of the order of $2\bar{\omega}=90°$ to $96°$) and a great aperture ratio and a high variable power ratio of a variable power ratio of the order of 8.5 to 10.

The zoom lens of the present invention is:

(1) A zoom lens having, in succession from the object side, a first lens unit of positive refractive power, a second lens unit of negative refractive power for focal length change, a third lens unit for correcting the changing of an imaging plane resulting from a focal length change, and a fixed fourth lens unit of positive refractive power, wherein the first lens unit has a front lens sub-unit of negative refractive power fixed during focusing, an intermediate lens sub-unit movable along the optical axis thereof for focusing, and a rear lens sub-unit of positive refractive power fixed during focusing, and when the variable power ratio of the zoom lens is Z and the maximum incidence height of the on-axis light beam in the first lens unit is ht and the maximum incidence height of the off-axis light beam of a maximum angle of view at the wide angle end in the first lens unit is hw and the maximum incidence height of the off-axis light beam of the maximum angle of view at a zoom position at a variable power ratio $Z^{1/4}$ is hz, an aspherical surface S1 is provided on at least one lens surface at a position satisfying 1.65<hw/ht and 1.15<hw/hz;

(2) Particularly, the aspherical surface AS1, when provided on a positive refracting surface, forms a shape in which positive refractive power becomes stronger toward the peripheral portion of the lens, and when provided on a negative refracting surface, forms a shape in which negative refractive power becomes weaker toward the peripheral portion of the lens, and when the combined focal length of the first lens unit in a state in which it is in focus on an object at infinity is f1 and the aspherical amounts (the amounts of displacement from a reference spherical surface) in 100%, 90% and 70% of the effective diameter of the lens on which the aspherical surface AS1 is provided are Δ10, Δ9 and Δ7, respectively, the aspherical surface AS1 is of a shape satisfying the following conditions:

$$1.0 \times 10^{-2} < |\Delta 10/f1| < 5.5 \times 10^{-2} \quad (1)$$

$$7.2 \times 10^{-3} < |\Delta 9/f1| < 3.7 \times 10^{-2}$$

$$2.7 \times 10^{-3} < |\Delta 7/f1| < 1.4 \times 10^{-2}$$

(3) Also, the front lens sub-unit comprises, in succession from the object side, at least two negative lenses and at least one positive lens, and the negative lens most adjacent to the object side forms a meniscus shape having its sharp concave surface facing the image plane side, and when the average of the Abbe numbers of the at least two negative lenses is Δv11n and the Abbe number of the positive lens is Δv11p, the front lens sub-unit satisfies the following condition:

$$19 < \Delta v11n - \Delta v11p \quad (2)$$

(4) Also, the intermediate lens sub-unit as a focusing lens comprises at least one positive lens movable toward the image plane side during focusing on an object at infinity to an object at a close distance, and having a shape having its sharp convex surface facing the image plane side;

(5) Also, the rear lens sub-unit is comprised of at least one negative lens and at least three positive lenses, and when the focal lengths of the first lens unit and the rear lens sub-unit are f1 and f13, respectively, and the Abbe number of the negative lens is Δv13n and the average of the Abbe numbers of the at least three positive lenses is Δv13p, the rear lens sub-unit satisfies the following conditions:

$$1.5 \leq f13/f1 \leq 2.0 \quad (3)$$

$$40 < \Delta v13p - \Delta v13n \quad (4)$$

(6) Also, the rear lens sub-unit has an aspherical surface AS2 provided on at least one surface thereof, the aspherical surface AS2, when provided on a positive refracting surface, forms a shape in which positive refractive power becomes weaker toward the peripheral portion of the lens, and when provided on a negative refracting surface, forms a shape in which negative refractive power becomes stronger toward the peripheral portion of the lens;

(7) Further, when in the lens of the zoom lens of item (6), the aspherical amounts in 100%, 90% and 70% of the effective diameter of the lens on which the aspherical surface AS2 is provided are Δ10, Δ9 and Δ7, respectively, the lens is of a shape satisfying the following conditions:

$$4.7 \times 10^{-3} < |\Delta 10/f1| < 7.0 \times 10^{-3} \quad (5)$$

$$2.6 \times 10^{-3} < |\Delta 9/f1| < 4.0 \times 10^{-3}$$

$$7.9 \times 10^{-4} < |\Delta 7/f1| < 1.2 \times 10^{-3}$$

BRIEF DESCRIPTION OF THE DRAWINGS

FIGS. 5A, 5B and 5C show the aberrations of Embodiment 1 of the present invention at a focal length f=5.50.

FIGS. 6A, 6B and 6C show the aberrations of Embodiment 1 of the present invention at a focal length f=9.39.

FIGS. 7A, 7B and 7C show the aberrations of Embodiment 1 of the present invention at a focal length f=13.75.

FIGS. 8A, 8B and 8C show the aberrations of Embodiment 1 of the present invention at a focal length f=42.08.

FIGS. 9A, 9B and 9C show the aberrations of Embodiment 1 of the present invention at a focal length f=46.75.

FIGS. 10A, 10B and 10C show the aberrations of Embodiment 2 of the present invention at a focal length f=5.50.

FIGS. 11A, 11B and 11C show the aberrations of Embodiment 2 of the present invention at a focal length f=9.39.

FIGS. 12A, 12B and 12C show the aberrations of Embodiment 2 of the present invention at a focal length f=13.75.

FIGS. 13A, 13B and 13C show the aberrations of Embodiment 2 of the present invention at a focal length f=42.08.

FIGS. 14A, 14B and 14C show the aberrations of Embodiment 2 of the present invention at a focal length f=46.75.

FIGS. 15A, 15B and 15C show the aberrations of Embodiment 3 of the present invention at a focal length f=5.20.

FIGS. 16A, 16B and 16C show the aberrations of Embodiment 3 of the present invention at a focal length f=9.01.

FIGS. 17A, 17B and 17C show the aberrations of Embodiment 3 of the present invention at a focal length f=13.00.

FIGS. 18A, 18B and 18C show the aberrations of Embodiment 3 of the present invention at a focal length f=40.11.

FIGS. 20A, 20B and 20C show the aberrations of Embodiment 4 of the present invention at a focal length f=5.00.

FIGS. 22A, 22B and 22C show the aberrations of Embodiment 4 of the present invention at a focal length f=12.50.

FIGS. 23A, 23B and 23C show the aberrations of Embodiment 4 of the present invention at a focal length f=37.50.

FIGS. 24A, 24B and 24C show the aberrations of Embodiment 4 of the present invention at a focal length f=50.00.

DESCRIPTION OF THE PREFERRED EMBODIMENTS

FIGS. 1 to 4 are lens cross-sectional views of Numerical Value Embodiments 1 to 4 of the present invention at the wide angle end.

In FIGS. 1 to 4, the letter F designates a focusing lens unit (fore lens unit) of positive refractive power as a first lens unit having a fixed front lens sub-unit F1 of negative refractive power having at least two negative lenses and at least one positive lens, an intermediate lens sub-unit F2 movable on the optical axis thereof during focusing, and a fixed rear lens sub-unit F3 of positive refractive power.

The letter V denotes a variator for focal length change having negative refractive power as a second lens unit, and the variator V is monotonously moved on the optical axis toward the imaging plane to thereby effect focal length change from the wide angle end (wide) to the telephoto (tele) end. The letter C designates a compensator of negative refractive power as a third lens unit having a convex locus toward the object side on the optical axis to correct the changing of the imaging plane resulting from a focal length change and moved non-linearly. The variator V and the compensator C together constitute a focal length changing system (zooming system).

The letters SP denotes a stop which determines open f number, and the letter R designates a fixed relay lens unit of positive refractive power as a fourth lens unit. The letter P denotes a color resolving prism, an optical filter or the like, and in FIGS. 1 to 4, it is shown as a glass block.

The present embodiment is a super-wide angle zoom lens which has a zoom ratio Z of 8.5 times or greater and in which the wide angle end angle of view $2a$ exceeds 90°, and further, in order to realize a zoom lens which has been made large in aperture in the entire zoom area, it is suitable as a zoom lens of a wide angle system which will satisfy a condition expression that fw/IS<0.53, where fw and IS are the focal length of the entire system at the wide angle end and the size of the photo-taking image field (the diagonal length of the image field), respectively.

Description will now be made of the features of the aspherical surface of the zoom lens according to the present invention.

Figure 27:
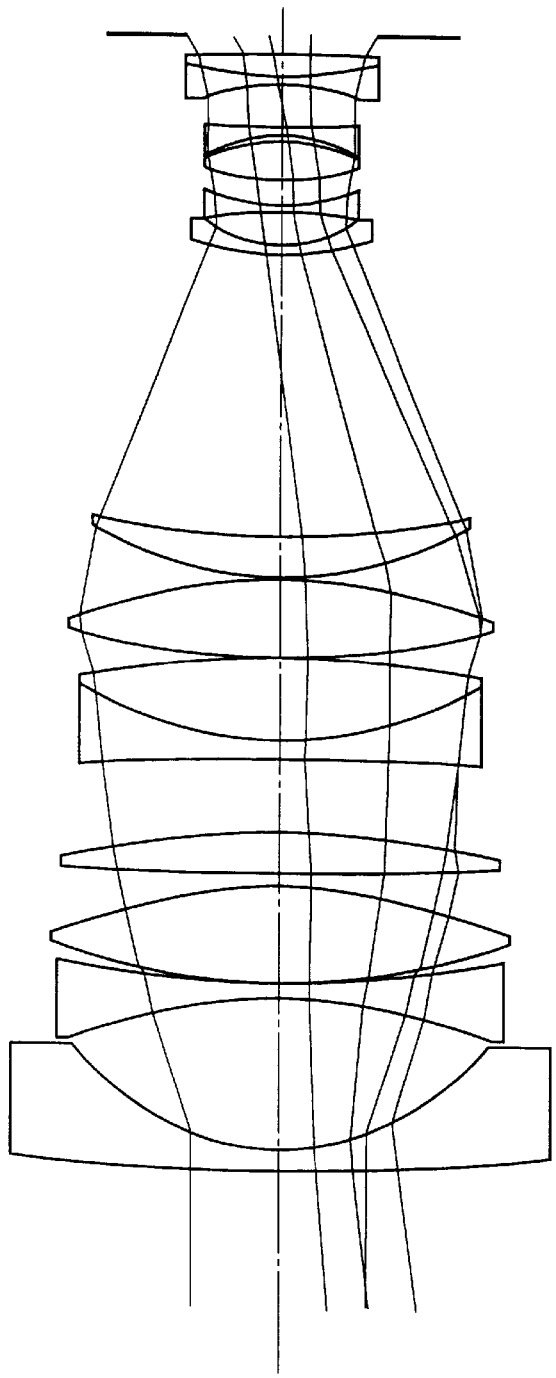
FIG. 27 shows the optical path of a portion of FIG. 1.
Figure 28:
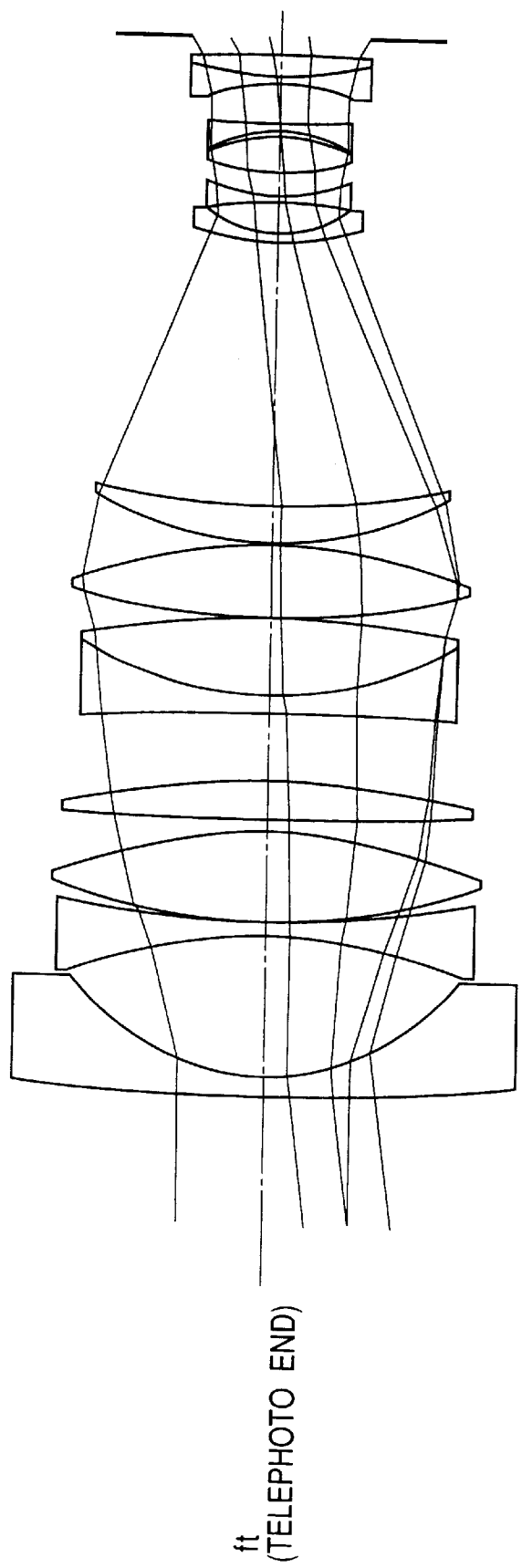
FIG. 28 shows the optical path of a portion of FIG. 1.
Figure 29:
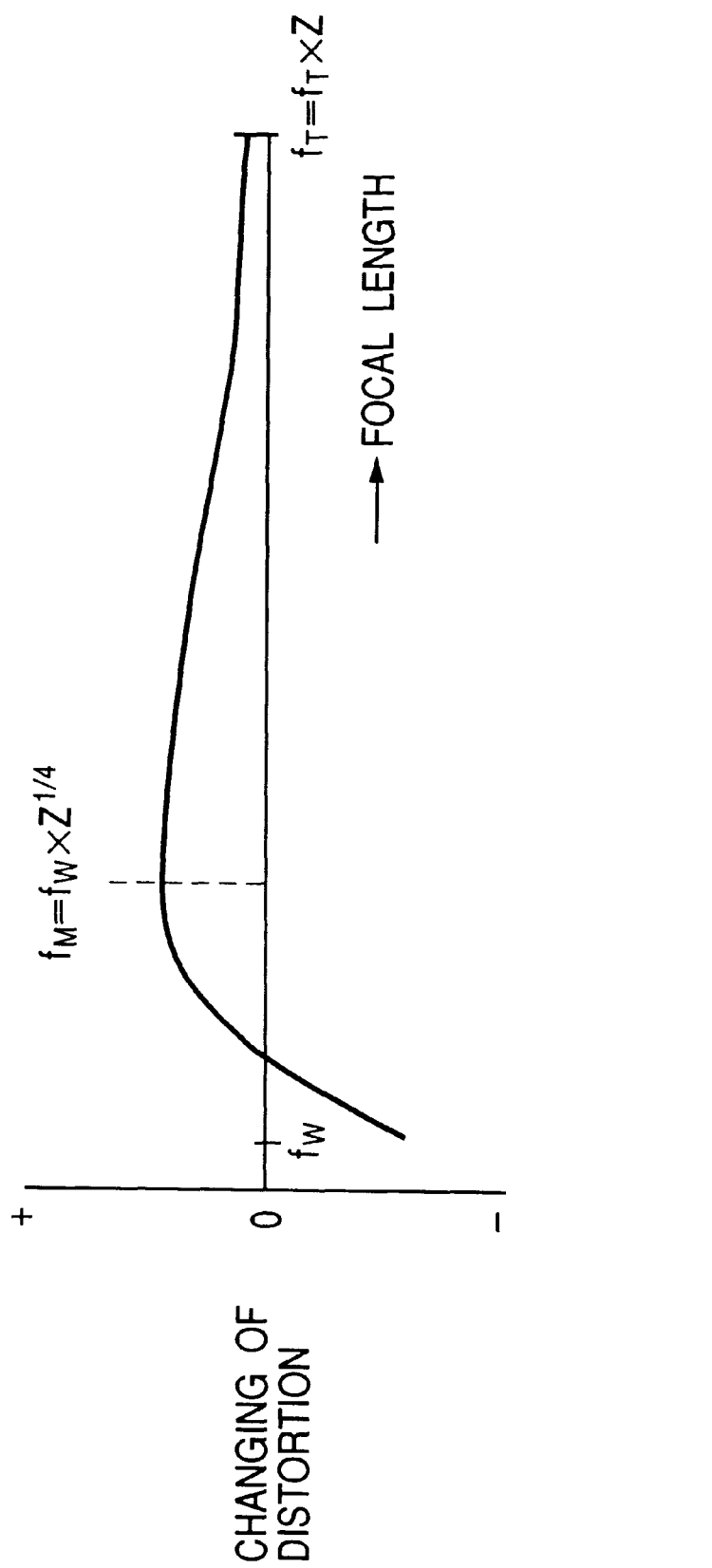
FIG. 29 is an illustration of the changing of an aberration resulting from the focal length change of a zoom lens.
Figure 30:
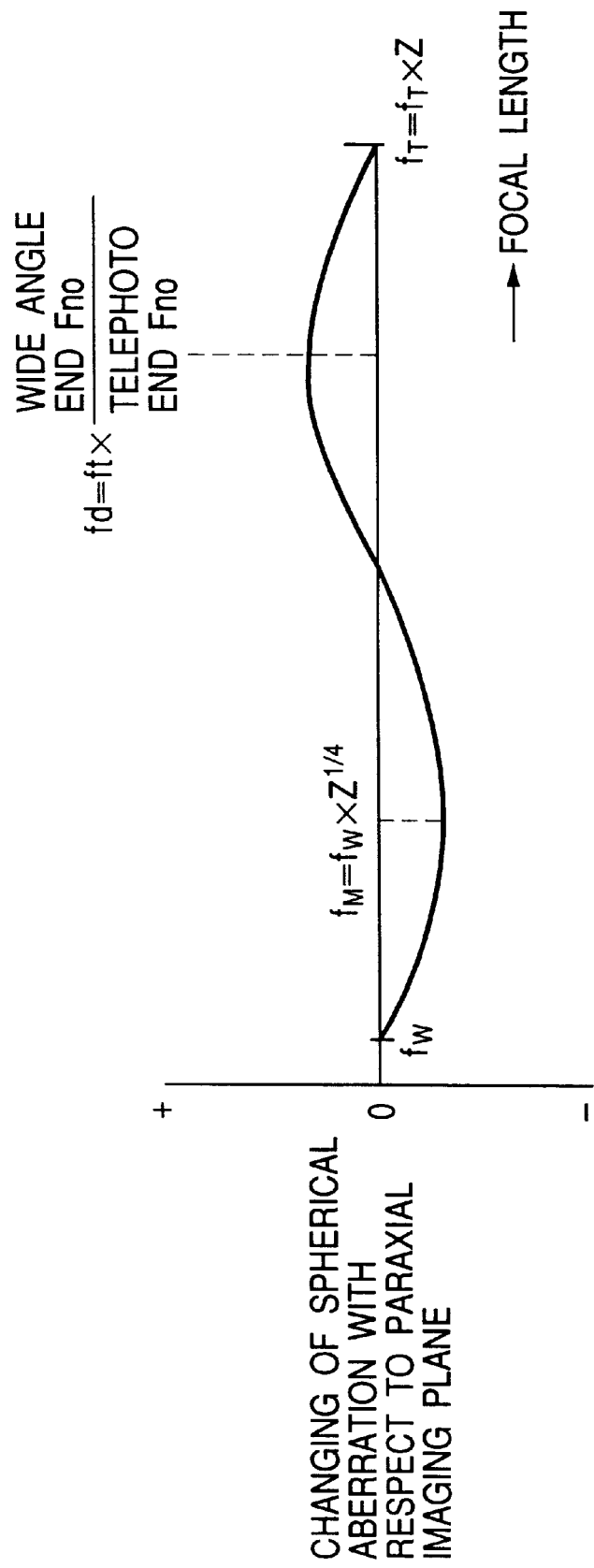
FIG. 30 is an illustration of the changing of an aberration resulting from the focal length change of a zoom lens.

In a zoom lens wherein the wide angle end angle of view $2a$ begins from $2\bar{\omega}=90°$ to 96° and the zoom ratio is on the order of 8.5 to 10 times, the incidence heights of an on-axis ray of light onto the fore lens unit and the variator become successively higher from the wide angle end to the telephoto end, as shown in FIGS. 25 to 28, and in a zoom lens having F drop, the incidence heights become highest at an F drop starting position (zoom position fd in FIG. 27). At the telephoto end, due to the F drop, the incidence heights become constant in the fore lens unit, and become low in the variator.

In contrast, a ray of light of the incidence height of the maximum off-axis ray of light (the height of a light beam of the maximum off-axis light beams which is farthest from the optical axis) passes through particularly the front lens subunit of the fore lens unit over the effective diameter thereof at the wide angle end, but the ray of light of this incidence height in the front lens sub-unit suddenly becomes low at a zoom position fm=fw×$Z^{1/4}$. On the other hand, conversely, the incidence height in the rear lens sub-unit of the fore lens unit suddenly becomes high. This tendency becomes more remarkable when an attempt is made to achieve a wider angle, a higher magnification, and compactness and lighter weight.

To efficiently correct distortion which changes greatly on the wide angle side when an aspherical surface is provided in the fore lens unit to thereby suppress the changing of aberrations, it is necessary to dispose the aspherical surface at an appropriate position.

So, in the present embodiment, the greatest feature is that in order to correct distortion which influences by the cube of the angle of view, within the entire variable power range, an aspherical surface AS1 is provided on at least one of the lens surfaces constituting the fore lens group which satisfies 1.65<hw/ht and 1.15<hw/hz, where ht is the maximum incidence height of the on-axis light beam, hw is the incidence height of the off-axis light beam at the maximum angle of view at the wide angle end, and hz in the incidence height of the off-axis light beam of the maximum angle of view at a zoom position at a variable power ratio $Z^{1/4}$.

Also, this aspherical surface is of a shape in which when an aspherical surface for correcting the changing of distortion on the wide angle side is provided on a positive refracting surface in the fore lens unit, positive refractive power becomes stronger toward the peripheral portion of the lens. On the other hand, when the aspherical surface is provided on a negative refracting surface, the aspherical surface is made into a shape in which negative refractive power becomes weaker toward the peripheral portion of the lens, whereby it is corrected so that the distortion near the wide angle end becomes under (minus).

Now, such shape of the aspherical surface corrects under distortion well near the wide angle end, but conversely speaking, regarding the distortion at a zoom position at a variable power ratio $Z^{1/4}$ this produces a contrary result, and over (plus) distortion attributable to the strong positive refractive power in the fore lens unit at the zoom position at the variable power ratio $Z^{1/4}$ is increased more strongly by the aspherical surface effect, whereby it becomes difficult to suppress the distortion.

So, the satisfaction of the above-mentioned condition that 1.65<hw/ht shows that the off-axis ray of light passes only near the wide angle end in the entire variable power range and the difference from the incidence height of the on-axis ray of light on the telephoto side is great, whereby the influence upon the changing or the like of spherical aberration on the telephoto side is suppressed to the utmost while the distortion at the wide angle end by a wider angle is corrected well. In addition, the concurrent satisfaction of the above-mentioned condition that 1.15<hw/hz shows that the off-axis ray of light passes only near the wide angle end in the entire variable power range and the difference from the incidence height of the off-axis light beam of a maximum angle of view near the zoom position at the variable power ratio $Z^{1/4}$ is great, and it is avoided that the over (plus) distortion attributable to the strong positive refractive power in the fore lens unit at the zoom position at the variable power ratio $Z^{1/4}$ is increased more strongly by the aspherical surface effect. Thereby, the influence upon the changing or the like of the distortion on the telephoto side is suppressed while the distortion at the wide angle end by a wider angle is corrected well.

More desirably, in accordance with an embodiment which will be described later, the position of the aspherical surface is applied to a location of 1.80<hw/ht and 1.20<hw/hz, whereby it becomes possible to provide a more desirable aspherical surface effect.

Further, in the present embodiment, in order to effectively correct the distortion at the wide angle end by the wider angle, the aspherical amount of the aspherical surface shape of the fore lens unit is set so as to satisfy the aforementioned conditional expression (1). What this condition means is that the central portion (the vicinity of the optical axis) of the aspherical lens is substantially spherical (or flat) and the aspherical amount (the amount of displacement from a reference spherical surface) becomes considerably greater toward the periphery of the lens. The above-mentioned conditional expression (1) prescribes the shape of this aspherical surface, and provides such action that the distortion correcting effect of the aspherical surface is displayed only in some zoom range of the entire zoom area near the wide angle end in which negative distortion is liable to occur, and in the other zoom area, the influence upon spherical aberration, astigmatism, coma, etc. is made as small as possible.

Next, in order to effectively correct optical performance for distortion and particularly chromatic aberration regarding the fore lens unit, the front lens sub-unit F1 in the present embodiment is comprised, in succession from the object side, of at least two negative lenses and at least one positive lens, and the negative lens most adjacent to the object side is made into a meniscus shape having a sharp concave surface facing the imaging plane side, whereby the occurrence of distortion at the wide angle end is suppressed to the utmost. Further, the achromatizing conditional expression (2) in the front lens sub-unit is satisfied to thereby effectively correct particularly the achromatism of the off-axis ray of light on the wide angle side.

If the lower limit value of conditional expression (2) is exceeded, achromatism will become insufficient and particularly the changing of chromatic difference of magnification on the wide angle side will greatly remain.

Now, the intermediate lens sub-unit F2 in the present embodiment introduces thereinto the so-called inner focus system for moving it toward the imaging plane side when effecting the focusing on an object at infinity to an object at a very close distance.

By doing so, the changing of aberrations by the object distance is corrected effectively and at the same time, the effects of downsizing the entire zoom lens and mitigating the focus operating torque are achieved. Also, the intermediate lens sub-unit F2 comprises at least one positive lens and the shape thereof is made into a shape having a sharp convex surface facing the imaging plane side to thereby achieve the effect of correcting distortion greatly changing to under (minus) at the wide angle end.

On the other hand, the rear lens sub-unit F3 is comprised of at least one negative lens and at least three positive lenses, and the focal length of the rear lens sub-unit F3 relative to the entire fore lens group is set as defined in conditional expression (3).

If the lower limit value of conditional expression (3) is exceeded, the radii of curvature of the lenses constituting the rear lens sub-unit F3 tend to suddenly become smaller, and the changing of aberrations particularly on the telephoto side will become great. The number of constituent lenses as the degree of freedom of design for correcting this needs to be great and it becomes difficult to achieve a larger aperture and downsizing. If the upper limit value of conditional expression (3) is exceeded, positive Petzval sum will remarkably decrease and it will become difficult to correct negative Petzval sum occurring in the variator V. Also, the principal point of the imaging plane as the entire fore lens unit comes in and this produces a contrary result against downsizing.

Further, the achromatizing conditional expression (4) in the rear lens sub-unit F3 is satisfied, and the achromatism of the on-axis ray of light particularly on the telephoto side is corrected.

If the lower limit value of conditional expression (4) is exceeded, achromatism will become insufficient and the on-axis chromatic aberration on the telephoto side will remain.

In the zoom lenses shown in FIGS. 1 to 4, the above-described conditions are satisfied, whereby the changing of aberrations is effectively corrected over the entire variable power range and high optical performance is obtained.

Now, in Numerical Value Embodiments 2 and 4 in the present embodiment, an aspherical surface for correcting the changing of spherical aberration on the telephoto side which remains to some extent is provided on at least one surface in the rear lens sub-unit F3 of the fore lens unit F.

Particularly, when the aspherical surface for correcting the changing of spherical aberration on the telephoto side is provided on the positive refracting surface of the rear lens sub-unit in the fore lens unit, the lens is made into a shape in which positive refractive power becomes weaker toward the peripheral portion of the lens, and when the aspherical surface is provided on the negative refracting surface of the rear lens sub-unit, the lens is made into a shape in which negative refractive power becomes stronger toward the peripheral portion of the lens, whereby it is corrected that the spherical aberration at the telephoto end becomes under (minus).

Further, in Embodiments 2 and 4, a spherical shape of such a shape that satisfies the aforementioned conditional expression (5) is adopted to effectively correct the spherical aberration at the telephoto end by the higher variable power of zoom. What this conditional expression means is a shape in which the center of the optical axis of the aspherical surface is substantially approximate to the spherical shape of the reference spherical surface and the aspherical amount becomes greater toward the periphery of the lens.

This conditional expression is for causing the spherical aberration correcting effect of the aspherical surface to be displayed only in some zoom range of the zoom area which is near the telephoto end in the variable power system of a zoom lens so that in the other zoom areas, the influence upon astigmatism, coma, etc. may not be provided as far as possible.

As the additional effect of this aspherical surface, it becomes also possible to suppress the over (plus) distortion attributable to the fact that the off-axis incidence height in the rear lens sub-unit at a zoom position $fm=fw \times Z^{1/4}$ suddenly becomes high, whereby the off-axis ray of light is strongly jumped up by the positive refractive power of the fore lens unit. That is, it is very effective to provide the aspherical surface on that lens surface adjacent to the object side of the fore lens unit in which the on-axis ray incidence height on the telephoto side is high and the change in the off-axis ray incidence height on the wide angle side is great.

Also, in Embodiments 2 and 4, in the variator V, concave, convex, concave, convex and concave lenses are disposed in succession from the object side. The negative lens most adjacent to the object side is made into a meniscus shape having its sharp concave surface facing the imaging plane, whereby the distortion at the wide angle end is effectively corrected.

The changing of chromatic aberration and particularly chromatic difference of magnification itself are corrected by the combination of the second and third concave and convex lenses. The variator V is comprised of five lenses and the thickness of the entire variator V is increased and therefore, if the correcting surface for achromatism as the variator is present closer to the imaging plane side, the deviation of the position of the principal point by the wavelength of the variator becomes greater and chromatic difference of magnification occurs greatly. Therefore, as in the construction of the embodiment, the cardinal point of achromatism as the variator V is made to exist on the object side to thereby correct chromatic difference of magnification well.

Further, the combination of the fourth and fifth concave and convex lenses is used and an appropriate refractive index is set between the two, thereby correcting the coma on the telephoto side in particular. The positive lens and the negative lens adopt one of the forms of joint and separation when the influences of high-order aberrations are taken into consideration, and an appropriate refractive index difference for sufficiently displaying the diverging effect of coma particularly when the form of joint is adopted is set.

As described above, in the present embodiment, the lens surface on which the aspherical surface is provided is appropriately set to thereby effectively correct the changing of the distortion on the wide angle side and the spherical aberration on the telephoto side, thus obtaining high optical performance over the entire variable power range.

The features of each embodiment (numerical value embodiment) of the present invention will now be described.

Figure 1:
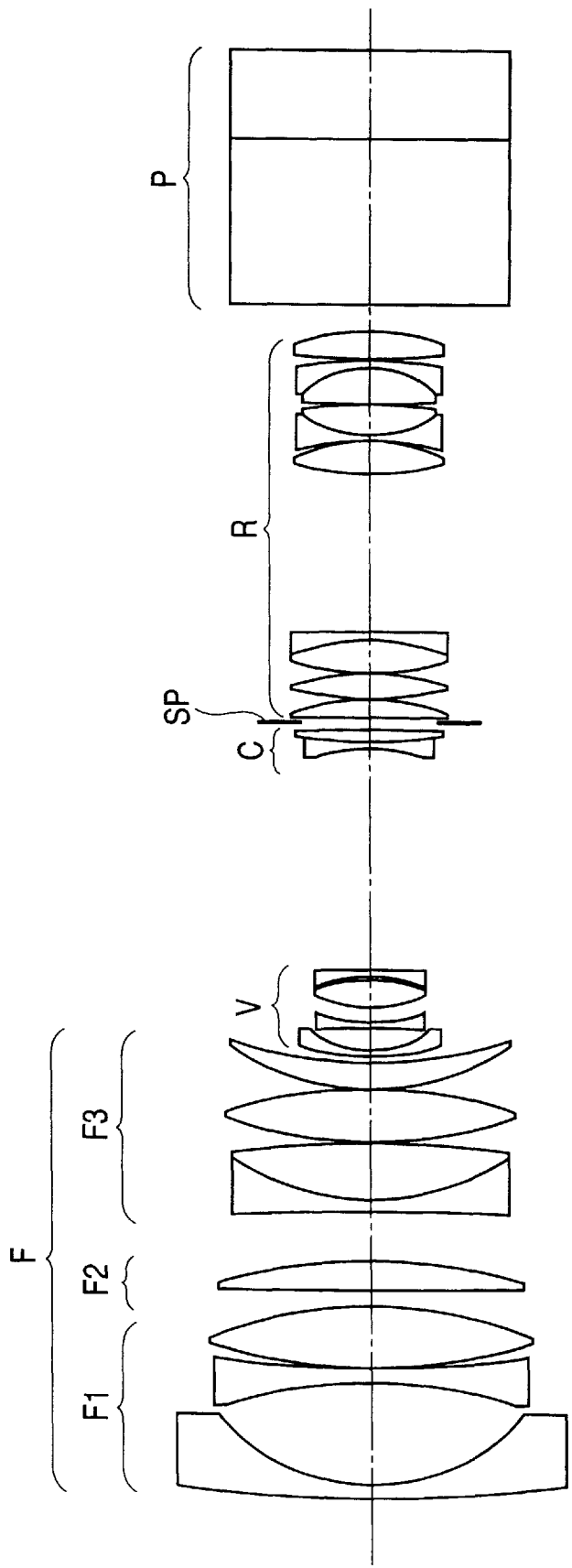
FIG. 1 is a lens cross-sectional view of the wide angle end of Numerical Value Embodiment 1 of the present invention.

Embodiment 1 shown in FIG. 1 has a zoom ratio of 8.5 times and the wide angle end angle of view $2\bar{\omega}$ exceeds 90°. R1 to R15 designate a fore lens unit F. R1 to R6 denote F1 fixed during focusing and having negative power (refractive power). R7 to R8 designate a lens unit F2 having the focusing action and movable toward the imaging plane side during the focusing on an object at infinity to an object at a very close distance, and R9 to R15 denote F3 fixed during focusing and having positive power. R16 to R23 designate a variator V monotonously movable toward the imaging plane side from wide (wide angle end) to tele (telephoto end) for focal length change. R24 to R26 denote a compensator C having the image point correcting action resulting from focal length change, and having negative power and movable toward the object side so as to describe a convex area during the focal length change from wide to tele. SP(27) designates a stop. R28 to R44 denote a relay lens unit R having the imaging action, and R45 to R47 designate a glass block equivalent to a color resolving prism.

In this Embodiment 1, when as an index for wider angles, the ratio between the wide angle end focal length fw of the entire zoom lens system and the photo-taking image field IS is defined as fw/IS, the zoom lens has a super-wide angle of fw/IS=0.5. For these wider angles, in the fore lens unit, the off-axis ray incidence height becomes great on the wide angle side and therefore, F1 which greatly influences various aberrations is comprised, in succession from the object side, of three concave, concave and convex lenses, and the concave lens most adjacent to the object side is made into a meniscus shape having its sharp concave surface facing the imaging plane side, whereby the occurrence of distortion in the fore lens unit is suppressed.

Also, a so-called inner focusing system using F2 as a focusing movable lens unit is adopted as a focusing system, whereby the changing of aberrations due to the object distance is corrected effectively and at the same time, effects such as the downsizing of the entire zoom lens and the mitigation of focus operating torque are achieved.

Further, the on-axis ray incidence height becomes great on the telephoto side and therefore, F3 which greatly influences the various aberrations on the telephoto side is comprised, in succession from the object side, of four lenses which are concave, convex, convex and convex lenses, and spherical aberration is caused to diverge by the concave lens and the occurrence of spherical aberration in the fore lens group suppressed.

The aforementioned conditional expressions are $\Delta v11n - \Delta v11p = 20.07$, $f13/f1 = 1.636$ and $\Delta v13p - \Delta v13n = 41.83$.

The variator V is comprised of four lenses which are concave, concave, convex and concave lenses, and spherical aberration, coma, etc. are caused to diverge by the convex lens to thereby suppress the occurrence of various aberrations in the variator.

The compensator is comprised of two concave and convex lenses, and spherical aberration and chromatic aberration are caused to diverge by the boundary surface therebetween to thereby suppress the occurrence of various aberrations.

The aspherical surface is provided on a surface R1, and the aspherical surface on the surface R1 effectively utilizes that the off-axis ray of light passes only near the wide angle end in the entire variable power range and the difference from the incidence height of the on-axis ray of light on the telephoto side is great and that the difference from the incidence height of the off-axis light beam of a maximum angle of view near the zoom position at the variable power ratio $Z^{1/4}$ is great, and $hw/ht = 2.886$ and $hw/hz = 1.306$.

The direction of the aspherical surface is a direction in which positive power becomes stronger as the amount of separation from the optical axis becomes greater, and in order to efficiently correct distortion and spherical aberration up to high-order areas, up to aspherical surface coefficients B, C, D and E are used. The aspherical amount at this time is 1057.9 μm at the maximum height of the incident ray of light on R1.

FIGS. 5A to 5C, FIGS. 6A to 6C, FIGS. 7A to 7C, FIGS. 8A to 8C, FIGS. 9A to 9C, FIGS. 10A to 10C, FIGS. 11A to 11C, FIGS. 12A to 12C, FIGS. 13A to 13C, FIGS. 14A to 14C, FIGS. 15A to 15C, FIGS. 16A to 16C, FIGS. 17A to 17C, FIGS. 18A to 18C, FIGS. 19A to 19C, FIGS. 20A to 20C, FIGS. 21A to 21C, FIGS. 22A to 22C, FIGS. 23A to 23C and FIGS. 24A to 24C show spherical aberration, astigmatism and distortion at respective zoom positions.

Figure 2:
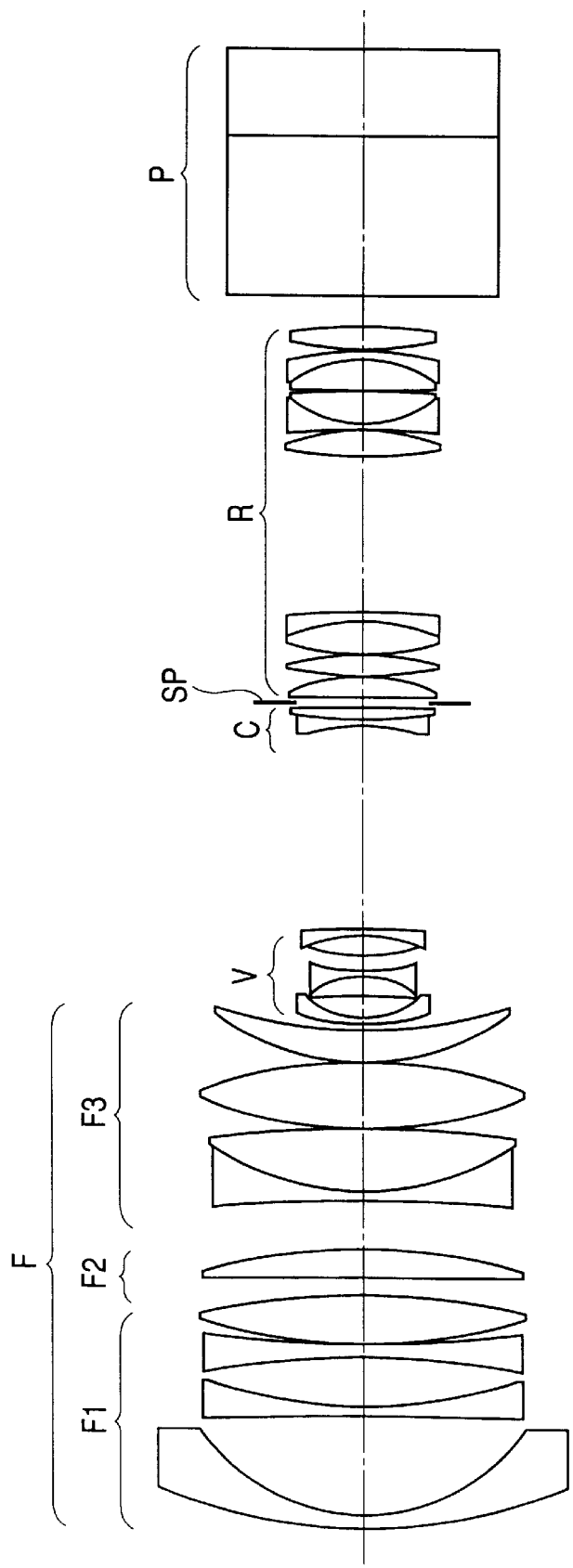
FIG. 2 is a lens cross-sectional view of the wide angle end of Numerical Value Embodiment 2 of the present invention.

Embodiment 2 shown in FIG. 2 has a zoom ratio of 8.5 times and the wide angle end angle of view $2\overline{\omega}$ exceeds 90°. Moreover, it is a zoom lens entirely free of F drop on the telephoto side. R1 to R17 designate a fore lens unit F. R1 to R8 denotes F1 fixed during focusing and having negative power (refractive power), R9 to R10 designate F2 having the focusing action and movable toward the imaging plane side during the focusing on an object at infinity to an object at a very close distance, and R11 to R17 denote F3 fixed during focusing and having positive power. R18 to R26 designate a variator V monotonously movable from wide (wide angle end) to tele (telephoto end) for focal length change. R27 to R29 denote a compensator C having the image point correcting action resulting from focal length change and having negative power, and movable toward the object side so as to describe a convex area during the focal length change from wide to tele. SP(30) designates a stop. R31 to R47 denote a relay lens unit R having the imaging action, and R48 to R50 designate a glass block equivalent to a color resolving prism.

In this Embodiment 2, when as an index for wider angles, the ratio between the wide angle end focal length fw of the entire zoom lens system and the photo-taking image field IS is defined as fw/IS, the zoom lens has a super-wide angle of fw/IS=0.5. In addition, in this Embodiment 2, F drop on the telephoto side does not occur at all. For these wider angles and large apertures, in the fore lens unit, the off-axis incidence height becomes great on the wide angle side and therefore, F1 which greatly influences the various aberrations on the wide angle side is comprised, in succession from the object side, of four lenses which are concave, concave, concave and convex lenses, and the concave lens most adjacent to the object side is made into a meniscus shape having its sharp concave surface facing the imaging plane side to thereby suppress the occurrence of distortion in the fore lens unit.

Also, a so-called inner focusing system using F2 as a focusing movable lens unit is adopted as a focusing system, whereby the changing of aberrations due to the object distance is corrected effectively and at the same time, effects such as the downsizing of the entire zoom lens and the mitigation of focus operating torque are achieved.

Further, the on-axis ray incidence height becomes great on the telephoto side and therefore, F3 which greatly influences the various aberrations on the telephoto side is comprised, in succession from the object side, of four lenses which are concave, convex, convex and convex lenses, and spherical aberration is caused to diverge by the concave lens and the occurrence of spherical aberration in the fore lens unit is suppressed.

The aforementioned conditional expressions are $\Delta v11n - \Delta v11p = 28.12$, $f13/f1 = 1.67$ and $\Delta v13p - \Delta v13n = 41.83$.

The variator V is comprised of five lenses which are concave, convex, concave, convex and concave lenses, and the second convex lens and the third concave lens are provided with an appropriate Abbe number difference therebetween to thereby effect achromatism as much as possible on the object side, and the fourth convex lens and the fifth concave lens are provided with an appropriate refractive index difference therebetween to thereby cause spherical aberration, coma etc. to diverge, thus suppressing the occurrence of various aberrations in the variator.

The compensator C is comprised of two lenses which are concave and convex lenses, and spherical aberration and chromatic aberration are caused to diverge by the boundary surface therebetween, thereby suppressing the occurrence of various aberrations.

Aspherical surfaces are provided on a surface R3 and a surface R16, and the aspherical surface on the surface R3 effectively utilizes that the off-axis ray of light passes only near the wide angle end in the entire variable power range and the difference from the on-axis ray of light on the telephoto side is great and that the off-axis ray of light passes only near the wide angle end in the entire variable power range and the difference from the incidence height of the off-axis light beam of a maximum angle of view near the zoom position at a variable power ratio $Z^{1/4}$ is great, and $hw/ht = 1.763$ and $hw/hz = 1.162$.

The direction of the aspherical surfaces is a direction in which positive power becomes stronger as the amount of separation from the optical axis becomes greater, and in order to efficiently correct distortion and spherical aberration up to high-order areas, up to aspherical surface coefficients B, C, D and E are used. The aspherical amount at this time is 336.3 μm at the maximum height of the incident ray onto R1.

The aspherical surface provided on the surface R16 corrects the spherical aberration occurring greatly on the telephoto side because appropriate F drop is not set. The direction of the aspherical surface is a direction in which positive power becomes weaker as the amount of separation from the optical axis becomes greater, and in order to efficiently correct distortion and spherical aberration up to high-order areas, up to aspherical surface coefficients B, C, D and E are used. The aspherical amount at this time is 198.1 μm at the maximum height of the incident ray onto R16. At the same time, this aspherical shape is a direction in which the over distortion at the variable power ratio $Z^{1/4}$ is mitigated, and is provided on R16 because the more effective is a lens surface on which the incidence height of the on-axis ray is great on the telephoto side and on which the incidence height of the off-axis ray at the variable power ratio $Z^{1/4}$ is great.

FIGS. 10A to 10C to 14A to 14C show spherical aberration, astigmatism and distortion at respective zoom positions.

Figure 3:
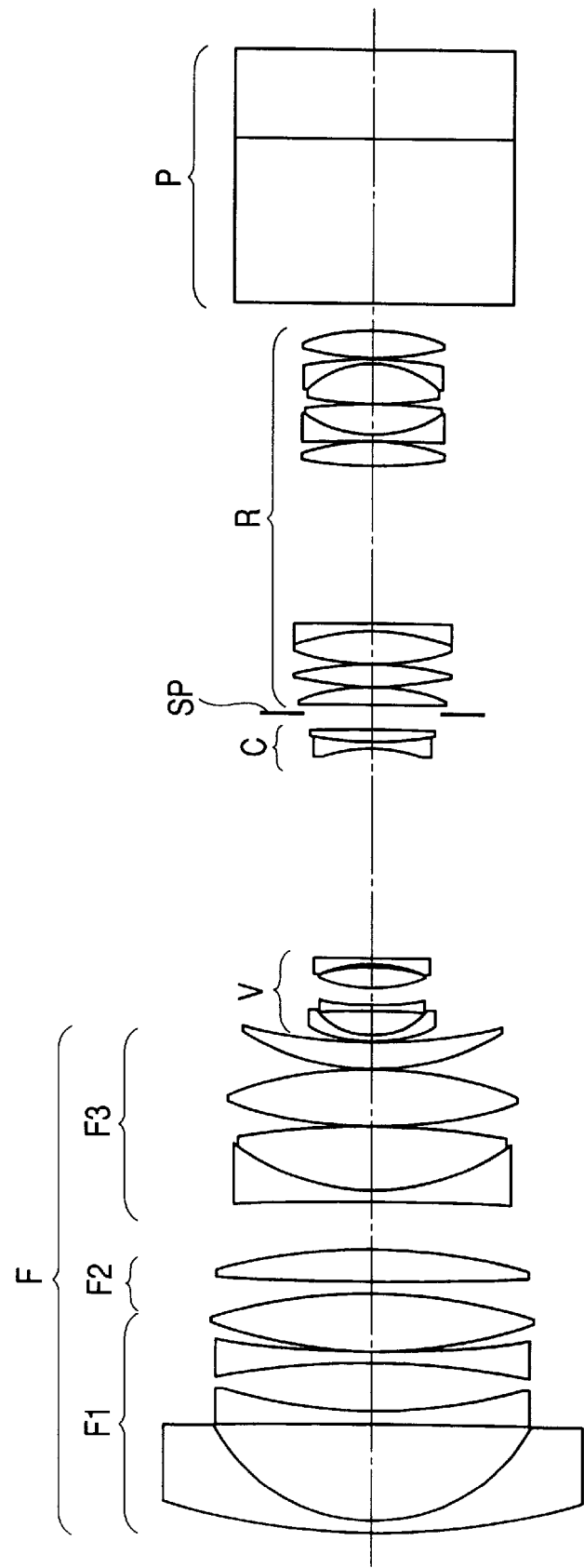
FIG. 3 is a lens cross-sectional view of the wide angle end of Numerical Value Embodiment 3 of the present invention.

Embodiment 3 shown in FIG. 3 has a zoom ratio of nine times, and the wide angle end angle of view $2\overline{\omega}$ exceeds 93°.

R1 to R17 designate a fore lens unit F. R1 to R8 denote F1 fixed during focusing and having negative power (refractive power), R9 to R10 designate F2 having the focusing action and movable to the imaging plane side during the focusing on an object at infinity to an object at a very close distance, and R11 to R17 denote F3 fixed during focusing and having positive power. R18 to R25 designate a variator V monotonously movable toward the imaging plane side from wide (wide angle end) to tele (telephoto end) for focal length change. R26 to R28 denote a compensator C having the image point correcting action resulting from a focal length change and having negative power, and movable toward the object side so as to describe a convex area during the focal length change from wide to tele. SP(29) designates a stop. R30 to R46 denote a relay lens unit R having the imaging action, and R47 to R49 designate a glass block equivalent to a color resolving prism.

In this Embodiment 3, when as an index for wider angles, the ratio between the wide angle end focal length fw of the entire zoom lens system and the photo-taking image field IS is defined as fw/IS, the zoom lens has a super-wide angle of tw/IS=0.473. For these wider angles, in the fore lens unit, the off-axis ray incidence height becomes great on the wide angle side and therefore, F1 which greatly influences the various aberrations on the wide angle side is comprised, in succession from the object side, of four lenses which are concave, concave, concave and convex lenses, and the concave lens most adjacent to the object side is made into a meniscus shape having its sharp concave surface facing the imaging plane side to thereby suppress the occurrence of distortion in the fore lens unit.

A so-called inner focusing system using F2 as a focusing movable lens unit is adopted as a focusing system, whereby the changing of aberrations due to the object distance is corrected effectively and at the same time, effects such as the downsizing of the entire zoom lens and the mitigation of focus operating torque are achieved.

Further, the on-axis ray incidence height becomes great on the telephoto side and therefore, F3 which grately influences the various aberrations on the telephoto side is comprised, in succession from the object side, of four lenses which are concave, convex, convex and convex lenses, and spherical aberration is caused to diverge by the concave lens and the occurrence of spherical aberration in the fore lens unit is suppressed.

The aforementioned conditional expressions are Δv11n−Δv11p=27.56, f13/f1=1.829 and Δv13p−Δv13n=41.83.

The variator V is comprised of four lenses which are concave, concave, convex and concave lenses, and spherical aberration, coma, etc. are caused to diverge by the convex lens and the occurrence of various aberrations in the variator is suppressed.

The compensator C is comprised of two lenses which are concave and convex lenses, and spherical aberration and chromatic aberration are caused to diverge by the boundary surface therebetween and the occurrence of various aberrations is suppressed.

An aspherical surface is provided on a surface R1, and the aspherical surface on the surface R1 effectively utilizes that the off-axis ray of light passes only near the wide angle end in the entire variable power range and the difference from the incidence height of the on-axis ray of light on the telephoto side is great and that the off-axis ray of light passes only near the wide angle end in the entire variable power range and the difference from the incidence height of the off-axis light beam of a maximum angle of view near the zoom position at a variable power ratio $Z^{1/4}$ is great, and hw/ht=3.358 and hw/hz=1.352.

The direction of the aspherical surface is a direction in which positive power becomes stronger as the amount of separation from the optical axis becomes greater, and in order to efficiently correct distortion and spherical aberration up to high-order areas, up to aspherical surface coefficients B, C, D and E are used. The aspherical amount at this time is 805.2 μm at the maximum height of the incident ray on R1.

FIGS. 15A to 15C to FIGS. 19A to 19C show spherical aberration, astigmatism and distortion at respective zoom positions.

Figure 4:
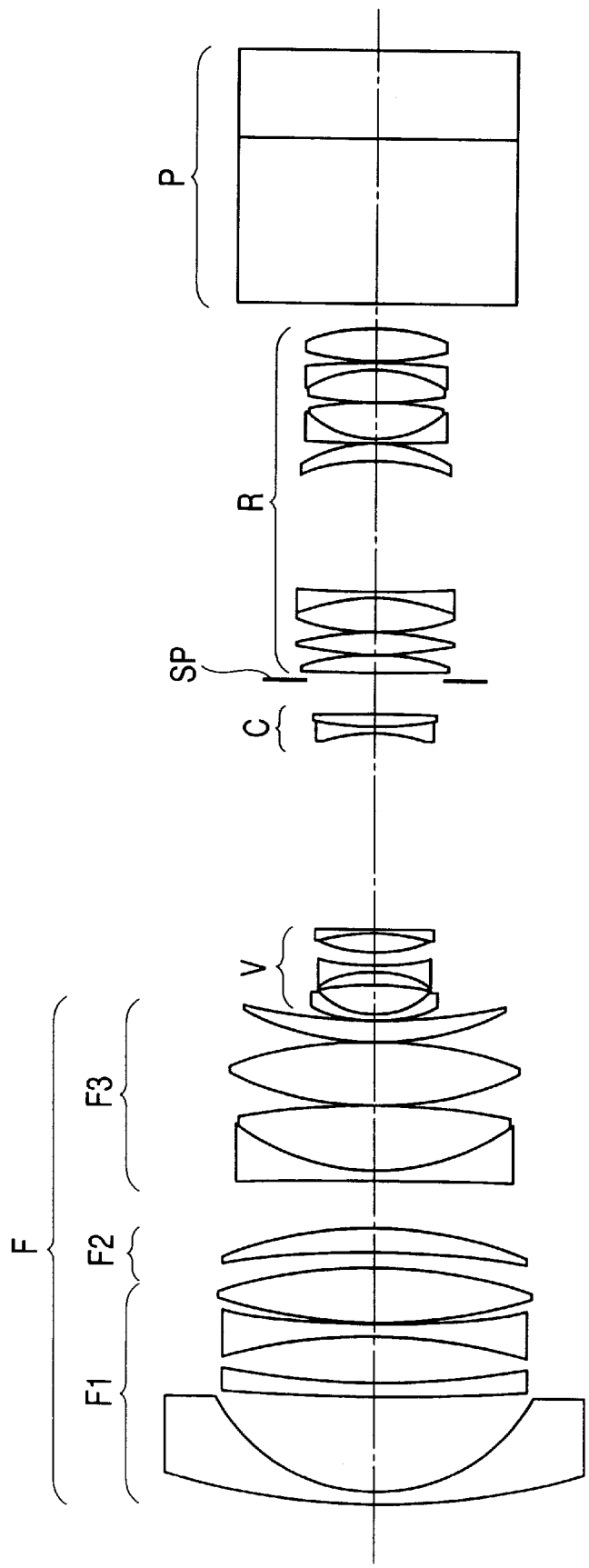
FIG. 4 is a lens cross-sectional view of the wide angle end of Numerical Value Embodiment 4 of the present invention.
Figures 19A, 19B, 19C:
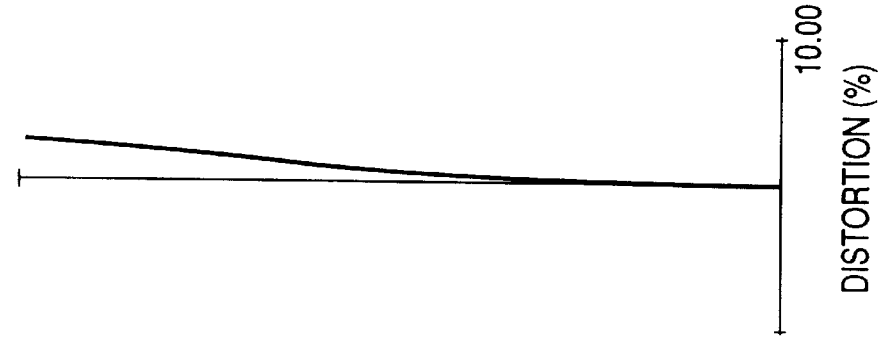
FIGS. 19A, 19B and 19C show the aberrations of Embodiment 3 of the present invention at a focal length f=46.80.
Figure 21C:
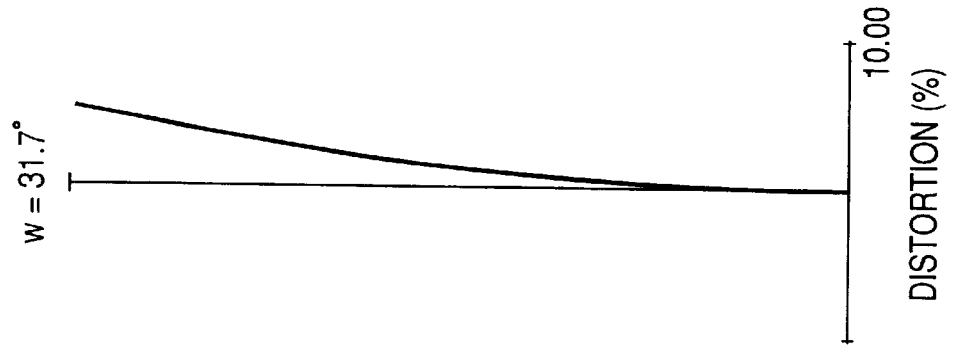
FIGS. 21A, 21B and 21C show the aberrations of Embodiment 4 of the present invention at a focal length f=8.89.
Figure 21B:
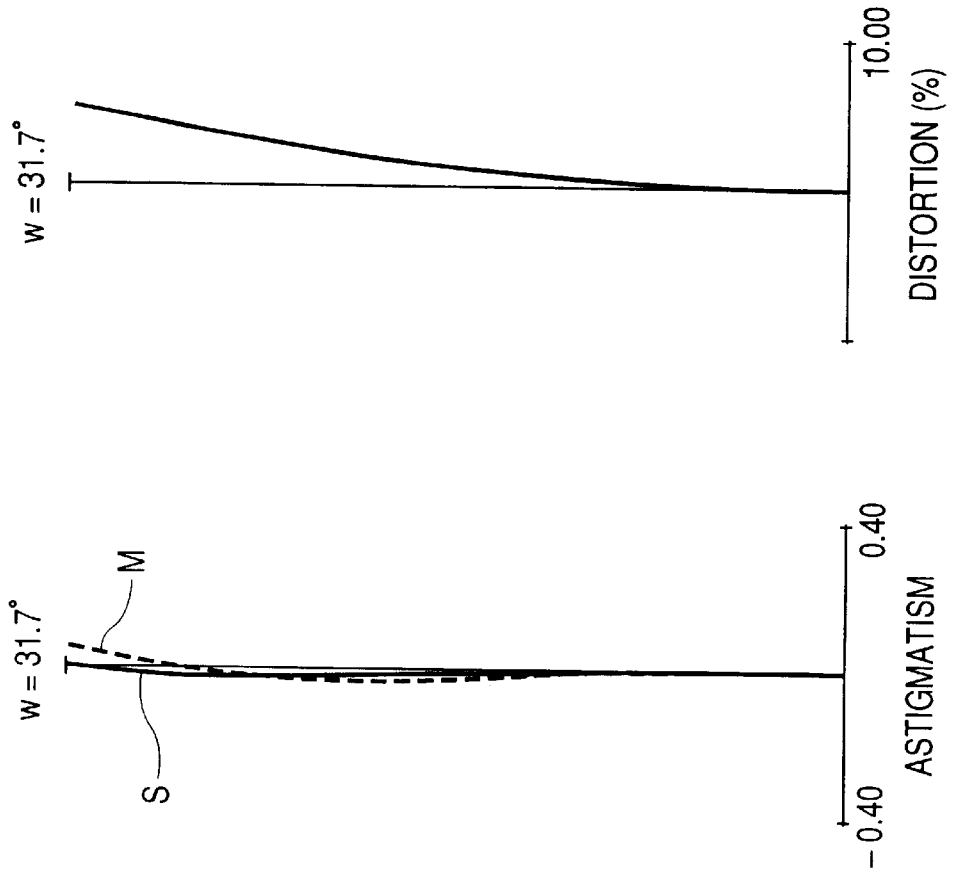
Figure 21A:
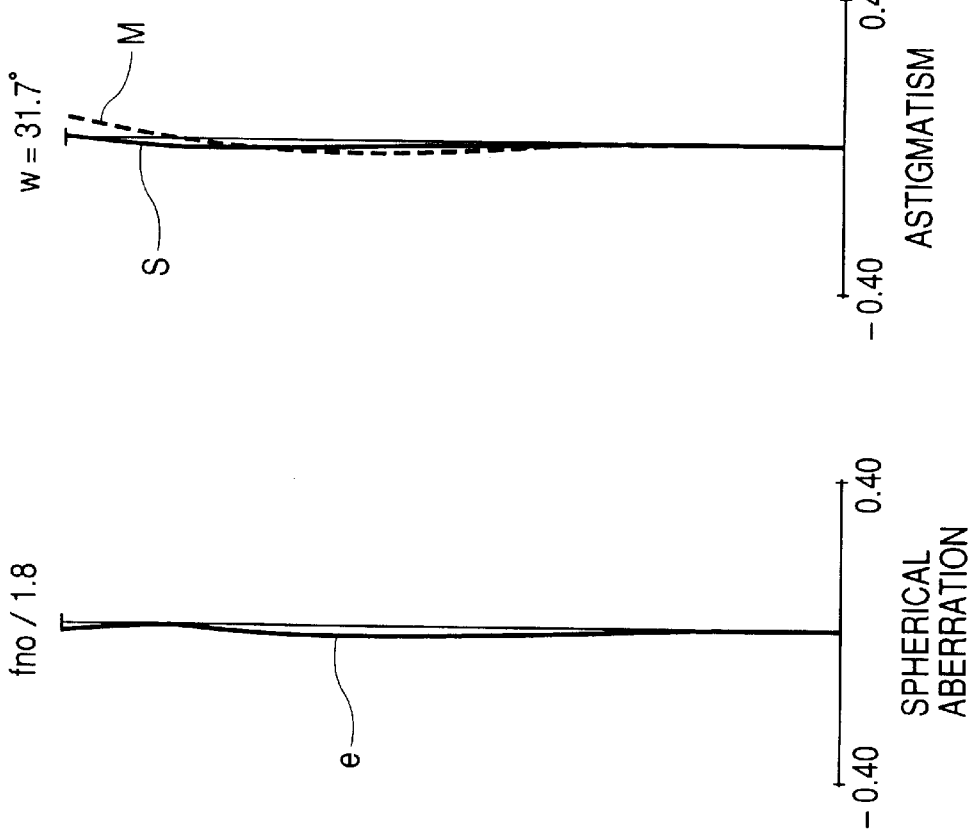
Figure 25:
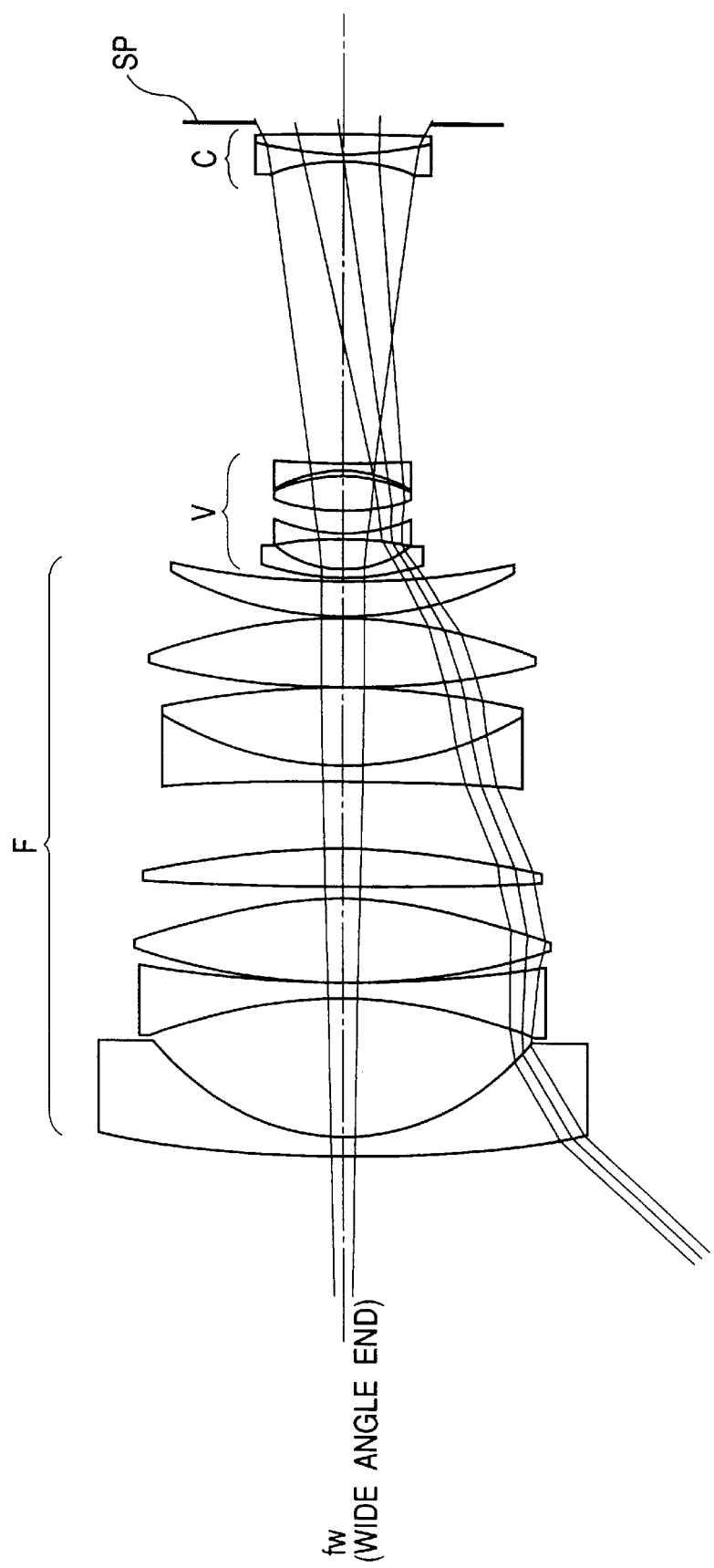
FIG. 25 shows the optical path of a portion of FIG. 1.
Figure 26:
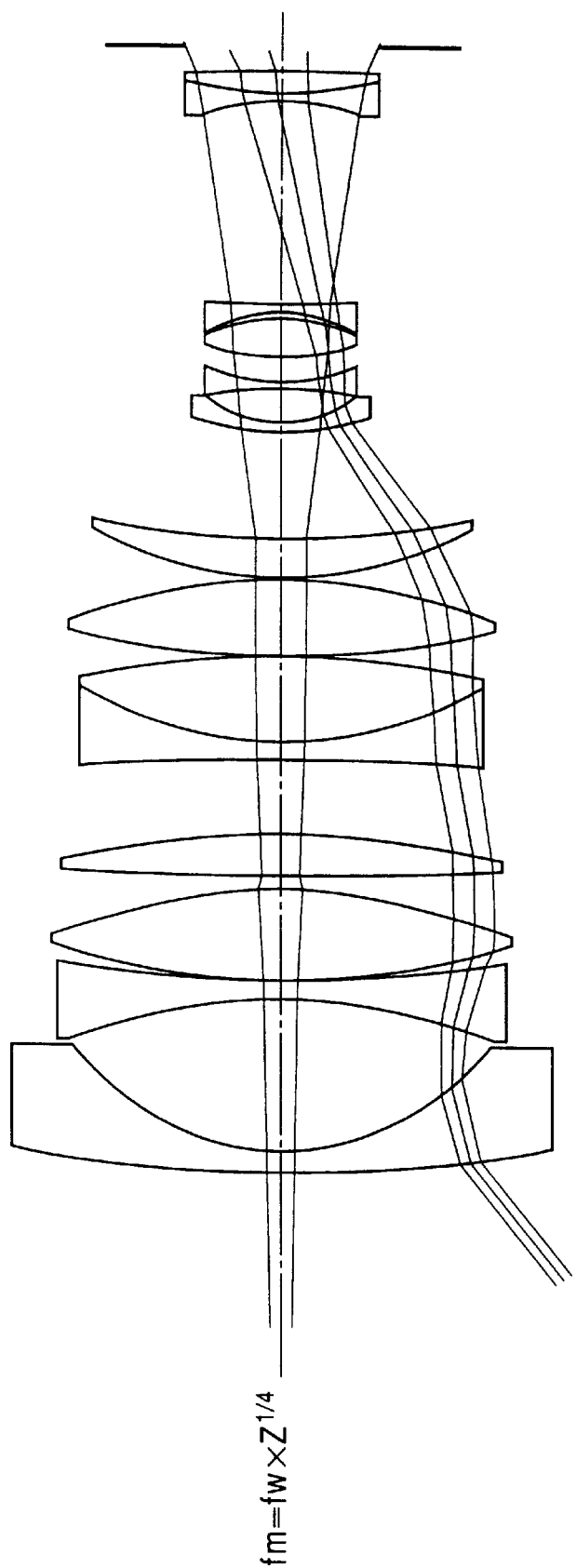
FIG. 26 shows the optical path of a portion of FIG. 1.

Embodiment 4 shown in FIG. 4 has a zoom ratio of ten times and the wide angle end angle of view $2\overline{\omega}$ exceeds 95°. R1 to R17 designate a fore lens unit F. R1 to R8 denote F1 fixed during focusing and having negative power (refractive power), R9 to R10 designate F2 having the focusing action and movable toward the imaging plane side during the focusing on an object at infinity to an object at a very close distance, and R11 to R17 denote F3 fixed during focusing and having positive power. R18 to R26 designate a variator V monotonously movable toward the imaging plane side from wide (wide angle end) to tele (telephot end) for focal length change. R27 to R29 denote a compensator C having the image point correcting action resulting from a focal length change and having negative power, and movable toward the object side so as to describe a convex area during the focal length change from wide to tele. SP(30) designates a stop. R31 to R47 denote a relay lens unit having the imaging action, and R48 to R50 designate a glass block equivalent to a color resolving prism.

In this Embodiment 4, when as an index for wider angles, the ratio between the wide angle end focal length fw of the entire zoom lens system and the photo-taking image field IS is defined as fw/IS, the zoom lens has a super-wide angle of fw/IS=0.454. For these wider angles, in the fore lens unit, the off-axis ray incidence height becomes great on the wide angle side and therefore, F1 which greatly influences the various aberrations on the wide angle side is comprised, in succession from the object side, of four lenses which are concave, concave, concave and convex lenses, and the concave lens most adjacent to the object side is made into a meniscus shape having its sharp concave surface facing the imaging plane side to thereby suppress the occurrence of distortion in the fore lens unit.

Also, a so-called inner focusing system using F2 as a focusing movable lens unit is adopted as a focusing system, whereby the changing of aberrations due to the object distance is corrected effectively and at the same time, effects such as the downsizing of the entire zoom lens and the mitigation of focus operating torque are achieved.

Further, the on-axis ray incidence height becomes great on the telephoto side and therefore, F3 which greatly influences the various aberrations on the telephoto side is comprised, in succession from the object side, of four lenses which are concave, convex, convex and convex lenses, and spherical aberration is caused to diverge by the concave lens and the occurrence of spherical aberration in the fore lens unit is suppressed.

The aforementioned conditional expressions are $\Delta v11n - \Delta v11p = 25.86$, $f13/f1 = 1.82$ and $\Delta v13p - \Delta v13n = 41.83$.

The variator V is comprised of five lenses which are concave, convex, concave, convex and concave lenses, and the second convex lens and the third concave lens are provided with an appropriate Abbe number difference therebetween and achromatism is effected as far as possible on the object side, and the fourth convex lens and the fifth concave lens are provided with an appropriate refractive index difference therebetween, whereby spherical aberration, coma, etc. are caused to diverge to thereby suppress the occurrence of various aberrations in the variator.

The compensator C is comprised of two lenses which are concave and convex lenses, and spherical aberration and chromatic aberration are caused to diverge by the boundary surface therebetween to thereby suppress the occurrence of various aberrations.

Aspherical surfaces are provided on a surface R1 and a surface R16, and the aspherical surface on the surface R1 effectively utilizes that the off-axis ray of light passes only near the wide angle end in the entire variable power range and the difference from the incidence height of the on-axis ray of light on the telephoto side is great and that the off-axis ray of light passes only near the wide angle end in the entire variable power range and the difference from the incidence height of the off-axis light beam of a maximum angle of view near the zoom position at the variable power ratio $Z^{1/4}$ is great, and hw/ht=3.561 and hw/hz=1.383.

The direction of the aspherical surface is a direction in which positive power becomes stronger as the amount of separation from the optical axis becomes greater, and in order to efficiently correct distortion and spherical aberration up to high-order areas, up to aspherical surface coefficients B, C, D and E are used. The aspherical amount at this time is 1400.6 μm at the maximum height of the incident ray of light on R1.

The aspherical surface provided on the surface R16 corrects the spherical aberration on the telephoto side. The direction of the aspherical surface is a direction in which positive power becomes weaker as the amount of separation from the optical axis becomes greater, and in order to efficiently correct distortion and spherical aberration up to high-order areas, up to aspherical surface coefficients B, C, D and E are used. The aspherical amount at this time is 135.5 μm at the maximum height of the incident ray of light on R16. This aspherical shape, at the same time, is in a direction in which the over distortion at the variable power ratio $Z^{1/4}$ is mitigated, and is provided on R16 because a lens surface in which the on-axis ray incidence height is great on the telephoto side and the off-axis ray incidence height at the variable power ratio $Z^{1/4}$ is great is more effective.

FIGS. 20A to 20C, 21A to 21C, 22A to 22C, 23A to 23C and FIGS. 24A to 24C show spherical aberration, astigmatism and distortion at respective zoom positions.

Some numerical value embodiments of the present invention will be shown below. In the numerical value embodiments, Ri represents the radius of curvature of the ith lens surface from the object side, Di represents the thickness and air space of the ith lens from the object side, and Ni and vi represent the refractive index and Abbe number, respectively, of the material of the ith lens from the object side.

When the X-axis is in the direction of the optical axis and the H-axis in a direction perpendicular to the optical axis and the direction of travel of light is positive and R is the paraxial radius of curvature and k, B, C, D and E are aspherical surface coefficients, the aspherical shape is represented by the following expression:

$$X = \frac{H^2/R}{1 + \sqrt{1 - (1+k)(H/R)^2}} + BH^4 + CH^6 + DH^8 + EH^{10}$$

| | (Numerical Value Embodiment 1) $f = 5.5$ to $46.75$ fno +1.8 to 2.0 $2w = 90°$ to $13.4°$ | | | |
|---|---|---|---|---|
| (aspherical surface) | r1 = 767.772 | d1 = 2.50 | n1 = 1.82017 | v1 = 46.6 |
| | r2 = 32.686 | d2 = 19.47 | | |
| | r3 = −78.489 | d3 = 2.00 | n2 = 1.82017 | v2 = 46.6 |
| | r4 = 136.127 | d4 = 0.20 | | |
| | r5 = 88.252 | d5 = 11.30 | n3 = 1.76859 | v3 = 26.5 |
| | r6 = −76.340 | d6 = 1.24 | | |
| | r7 = 1861.454 | d7 = 5.38 | n4 = 1.49845 | v4 = 81.6 |
| | r8 = −97.352 | d8 = 10.10 | | |
| | r9 = −658.162 | d9 = 2.00 | n5 = 1.81265 | v5 = 254 |
| | r10 = 44.836 | d10 = 10.21 | n6 = 1.49845 | v6 = 81.6 |
| | r11 = −166.063 | d11 = 0.20 | | |
| | r12 = 85.569 | d12 = 10.07 | n7 = 1.60520 | v7 = 65.6 |
| | r13 = −71.853 | d13 = 0.20 | | |
| | r14 = 45.705 | d14 = 4.79 | n8 = 1.73234 | v8 = 54.7 |
| | r15 = 94.082 | d15 = variable | | |

-continued (Numerical Value Embodiment 1)
f = 5.5 to 46.75   fno +1.8 to 2.0   2w = 90° to 13.4°

| | | | |
|---|---|---|---|
| r16 = 36.489 | d16 = 0.80 | n9 = 1.88814 | ν9 = 40.8 |
| r17 = 14.884 | d17 = 4.67 | | |
| r18 = −63.944 | d18 = 0.80 | n10 = 1.88814 | ν10 = 40.8 |
| r19 = 25.851 | d19 = 2.80 | | |
| r20 = 23.222 | d20 = 5.03 | n11 = 1.79191 | ν11 = 25.7 |
| r21 = −26.612 | d21 = 0.84 | | |
| r22 = −21.208 | d22 = 0.80 | n12 = 1.88814 | ν12 = 40.8 |
| r23 = 132.833 | d23 = variable | | |
| r24 = −27.903 | d24 = 0.80 | n13 = 1.77621 | ν13 = 49.6 |
| r25 = 64.341 | d25 = 2.57 | n14 = 1.85501 | ν14 = 23.9 |
| r26 = −205.966 | d26 = variable | | |
| r27 = (stop) | d27 = 1.20 | | |
| r28 = −340.189 | d28 = 3.94 | n15 = 1.50014 | ν15 = 65.0 |
| r29 = −32.038 | d29 = 0.15 | | |
| r30 = 107.653 | d30 = 3.72 | n16 = 1.50349 | ν16 = 56.4 |
| r31 = −60.918 | d31 = 0.15 | | |
| r32 = 45.740 | d32 = 6.78 | n17 = 1.50349 | ν17 = 56.4 |
| r33 = −33.931 | d33 = 1.20 | n18 = 1.82017 | ν18 = 46.6 |
| r34 = −384.229 | d34 = 30.00 | | |
| r35 = 56.736 | d35 = 5.15 | n19 = 1 51825 | ν19 = 64.2 |
| r36 = −37.851 | d36 = 0.15 | | |
| r37 = −68.700 | d37 = 1.20 | n20 = 1.88814 | ν20 = 40.8 |
| r38 = 21.283 | d38 = 5.78 | n21 = 1.51825 | ν21 = 64.2 |
| r39 = −170.854 | d39 = 0.15 | | |
| r40 = 1021.831 | d40 = 6.49 | n22 = 1.55099 | ν22 = 45.8 |
| r41 = −17.525 | d41 = 1.20 | n23 = 1.81265 | ν23 = 25.4 |
| r42 = −60.667 | d42 = 0.15 | | |
| r43 = 60.452 | d43 = 5.36 | n24 = 1.65223 | ν24 = 33.8 |
| r44 = −41.692 | d44 = 5.00 | | |
| r45 = ∞ | d45 = 30.00 | n25 = 1.60718 | ν25 = 38.0 |
| r46 = ∞ | d46 = 16.20 | n26 = 1.51825 | ν26 = 64.1 |
| r47 = ∞ | | | |

TABLE 1

| Variable | Focal length | | | | |
|---|---|---|---|---|---|
| spacing | 5.50 | 9.39 | 13.75 | 42.08 | 46.75 |
| d15 | 0.56 | 14.25 | 21.71 | 35.86 | 36.71 |
| d23 | 42.39 | 26.25 | 17.49 | 5.95 | 6.14 |
| d26 | 1.00 | 3.44 | 4.75 | 2.14 | 1.10 | aspherical surface shape
surface R1
reference spherical   aspherical
surface R = 767.772   amount (R1)   h   Δ
aspherical surface    70%    (23.47 mm)   300.2 μm
coefficient           90%    (30.18 mm)   740.4 μm
k = 4.499 × D²       100%   (33.53 mm)  1057.9 μm TABLE 1-continued

| Variable | Focal length | | | | |
|---|---|---|---|---|---|
| spacing | 5.50 | 9.39 | 13.75 | 42.08 | 46.75 |

B = 1.628 × D$^{-6}$
C = −4.253 × D$^{-10}$
D = 2.066 × D$^{-13}$
E = −1.675 × D$^{-16}$
Zoom parameter
fw/IS = 0.5
hw/ht = 2.886
hw/hz = 1.306
Δν11n–Δν11p = 20.07
f13/f1 = 1.636
Δν13n–Δν13p = 41.83

(Numerical Value Embodiment 2)
f = 5.5 to 46.75   fno = 1.8   2w = 90° to 13.4°

| | | | | |
|---|---|---|---|---|
| (aspherical surface) | r1 = 97.068 | d1 = 2.50 | n1 = 1.77621 | ν1 = 49.6 |
| | r2 = 33.932 | d2 = 18.98 | | |
| | r3 = −665.567 | d3 = 2.00 | n2 = 1.69979 | ν2 = 55.5 |
| | r4 = 80.425 | d4 = 9.76 | | |
| | r5 = −136.818 | d5 = 2.00 | n3 = 1.69979 | ν3 = 555 |
| | r6 = 184.824 | d6 = 0.20 | | |
| | r7 = 94.236 | d7 = 9.13 | n4 = 1.81265 | ν4 = 25.4 |

-continued (Numerical Value Embodiment 2)
f = 5.5 to 46.75    fno = 1.8    2w = 90° to 13.4°

|  |  |  |  |  |
|---|---|---|---|---|
|  | r8 = −138.818 | d8 = 1.22 |  |  |
|  | r9 = 3090.860 | d9 = 6.08 | n5 = 1.49845 | v5 = 81.6 |
|  | r10 = −91.089 | d10 = 10.06 |  |  |
|  | r11 = −417.889 | d11 = 2.00 | n6 = 1.81264 | v6 = 25.4 |
|  | r12 = 46.330 | d12 = 11.55 | n7 = 1 49845 | v7 = 81.6 |
|  | r13 = −222.307 | d13 = 0.20 |  |  |
|  | r14 = 81.468 | d14 = 12.72 | n8 = 1.60520 | v8 = 65.5 |
|  | r15 = −74.895 | d15 = 0.20 |  |  |
| (aspherical | r16 = 45 554 | d16 = 5.81 | n9 = 1.73234 | v9 = 54.7 |
| surface) | r17 = 98.609 | d17 = variable |  |  |
|  | r18 = 35.274 | d18 = 0.80 | n10 = 1.88814 | v10 = 40.8 |
|  | r19 = 13.894 | d19 = 5.07 |  |  |
|  | r20 = −52.577 | d20 = 3.38 | n11 = 1.79191 | v11 = 25.7 |
|  | r21 = −13.945 | d21 = 0.80 | n12 = 1.82017 | v12 = 46.6 |
|  | r22 = 32.430 | d22 = 2.47 |  |  |
|  | r23 = 25.717 | d23 = 4.36 | n13 = 1.62409 | v13 = 36.3 |
|  | r24 = −26.590 | d24 = 0.38 |  |  |
|  | r25 = −22.907 | d25 = 0.80 | n14 = 1.83945 | v14 = 42.7 |
|  | r26 = −272.680 | d26 = variable |  |  |
|  | r27 = −27.753 | d27 = 0.80 | n15 = 1.77621 | v15 = 49.6 |
|  | r28 = 70.696 | d28 = 2.53 | n16 = 1.85501 | v16 = 23.9 |
|  | r29 = −194.277 | d29 = variable |  |  |
|  | r30 = (stop) | d30 = 1.20 |  |  |
|  | r31 = −329.251 | d31 = 3.85 | n17 = 1.52032 | v17 = 59.0 |
|  | r32 = −33.663 | d32 = 0.15 |  |  |
|  | r33 = 109.721 | d33 = 3.58 | n18 = 1.50349 | v18 = 56.4 |
|  | r34 = −67.095 | d34 = 0.15 |  |  |
|  | r35 = 48.472 | d35 = 6.76 | n19 = 1.50349 | v19 = 56.4 |
|  | r36 = −32.464 | d36 = 1.20 | n20 = 1.82017 | v20 = 46.6 |
|  | r37 = −305.379 | d37 = 30.00 |  |  |
|  | r38 = 81.431 | d38 = 4.96 | n21 = 1.51825 | v21 = 64.2 |
|  | r39 = −42.735 | d39 = 0.15 |  |  |
|  | r40 = −133.745 | d40 = 1.20 | n22 = 1.88814 | v22 = 40.8 |
|  | r41 = 22.914 | d41 = 5.85 | n23 = 1.51825 | v23 = 64.2 |
|  | r42 = −473.752 | d42 = 0.15 |  |  |
|  | r43 = 273.136 | d43 = 6.04 | n24 = 1.55099 | v24 = 45.8 |
|  | r44 = −22.885 | d44 = 1.20 | n25 = 1.81265 | v25 = 25.4 |
|  | r45 = −66.890 | d45 = 0.15 |  |  |
|  | r46 = 41.727 | d46 = 5.09 | n26 = 1.58482 | v26 = 40.8 |
|  | r47 = −72.688 | d47 = 5.00 |  |  |
|  | r48 = ∞ | d48 = 30.00 | n27 = 1.60718 | v27 = 38.0 |
|  | r49 = ∞ | d49 = 16.20 | n28 = 1.51825 | v28 = 64.1 |
|  | r50 = ∞ |  |  |  |

TABLE 2

| Variable | Focal length | | | | |
|---|---|---|---|---|---|
| spacing | 5.50 | 9.39 | 13.75 | 42.08 | 46.75 |
| d17 | 0.69 | 14.38 | 21.83 | 35.99 | 36.84 |
| d26 | 40.24 | 24.10 | 15.34 | 3.80 | 3.99 |
| d29 | 1.00 | 3.44 | 4.75 | v2.14 | 1.10 | aspherical surface shape
surface R3
reference spherical    aspherical
surface R = −665.567   amount (R3)       h              Δ
aspherical surface     70%              (20.09 mm)      87.8 μm
coefficient            90%              (25.83 mm)     227.1 μm
$k = 2.230 \times D^0$    100%              (28.70 mm)     336.3 μm
$B = 6.085 \times D^{-7}$     aspherical
$C = -2.254 \times D^{-10}$   amount (R16)       h              Δ
$D = 1.616 \times D^{-13}$   70%              (18.31 mm)     33.5 μm TABLE 2-continued

| Variable | Focal length | | | | |
|---|---|---|---|---|---|
| spacing | 5.50 | 9.39 | 13.75 | 42.08 | 46.75 |

$E = -6.431 \times D^{-17}$     90%              (23.54 mm)    112.4 μm
surface R16            100%             (26.16 mm)    198.1 μm
reference spherical    zoom parameter
surface R = 45.554     fw/IS = 0.5
aspherical surface     hw/ht = 1.763
coefficient            hw/hz = 1.162
$k = -1.901 \times D^2$    Δv11n−Δv11p = 28.12
$B = -2.116 \times D^{-7}$   f13/f1 = 1.67
$C = -1.366 \times D^{-10}$
$D = -2.652 \times D^{-14}$
$E = -2.143 \times D^{-16}$

| (Numerical Value Embodiment 3) | | | |
|---|---|---|---|
| f = 5.2 to 46.8 | fno = 1.8 to 2.1 | 2w = 93.2° to 13.4° | |
| (aspherical surface) r1 = 133.567 | d1 = 2.50 | n1 = 1.77621 | ν1 = 49.6 |
| r2 = 31.225 | d2 = 17.75 | | |
| r3 = −1863.383 | d3 = 2.00 | n2 = 1.73234 | ν2 = 547 |
| r4 = 84.678 | d4 = 9.01 | | |
| r5 = −140.200 | d5 = 2.00 | n3 = 1.73234 | ν3 = 547 |
| r6 = 214.253 | d6 = 0.20 | | |
| r7 = 91.689 | d7 = 10.05 | n4 = 1.81255 | ν4 = 25.4 |
| r8 = −107.116 | d8 = 1.20 | | |
| r9 = 972.680 | d9 = 6.53 | n5 = 1.48915 | ν5 = 70.2 |
| r10 = −84.575 | d10 = 10.05 | | |
| r11 = −330.168 | d11 = 2.00 | n6 = 1.81264 | ν6 = 25.4 |
| r12 = 42.954 | d12 = 10.95 | n7 = 1.49845 | ν7 = 81.6 |
| r13 = −143.390 | d13 = 0.20 | | |
| r14 = 80.802 | d14 = 10.00 | n8 = 1.60520 | ν8 = 65.5 |
| r15 = −74.791 | d15 = 0.20 | | |
| r16 = 46.624 | d16 = 4.41 | n9 = 1.73234 | ν9 = 547 |
| r17 = 89.951 | d17 = variable | | |
| r18 = 36.638 | d18 = 0.80 | n10 = 1.88814 | ν10 = 40.8 |
| r19 = 13.780 | d19 = 5.02 | | |
| r20 = −46.148 | d20 = 0.80 | n11 = 1.83945 | ν11 = 42.7 |
| r21 = 32.757 | d21 = 2.78 | | |
| r22 = 27.332 | d22 = 4.18 | n12 = 1.79191 | ν12 = 25.7 |
| r23 = −33.589 | d23 = 0.49 | | |
| r24 = −25.382 | d24 = 0.80 | n13 = 1.82017 | ν13 = 46.6 |
| r25 = 450.224 | d25 = variable | | |
| r26 = −29.318 | d26 = 0.80 | n14 = 1.77621 | ν14 = 49.6 |
| r27 = 57.089 | d27 = 2.44 | n15 = 1.85501 | ν15 = 23.9 |
| r28 = −267.542 | d28 = variable | | |
| r29 = (stop) | d29 = 1.20 | | |
| r30 = −345.052 | d30 = 3.71 | n16 = 1.50014 | ν16 = 65.0 |
| r31 = −33.307 | d31 = 0.15 | | |
| r32 = 108.966 | d32 = 3.40 | n17 = 1.50349 | ν17 = 56.4 |
| r33 = −66.285 | d33 = 0.15 | | |
| r34 = 46.492 | d34 = 6.34 | n18 = 1.50349 | ν18 = 56.4 |
| r35 = −32.104 | d35 = 1.20 | n19 = 1.82017 | ν19 = 46.6 |
| r36 = −525.239 | d36 = 30.00 | | |
| r37 = 157.757 | d37 = 4.29 | n20 = 1.51825 | ν20 = 64.2 |
| r38 = −36.928 | d38 = 0.15 | | |
| r39 = −92.667 | d39 = 1.20 | n21 = 1.88814 | ν21 = 40.8 |
| r40 = 21.383 | d40 = 5.98 | n22 = 1.51825 | ν22 = 64.2 |
| r41 = −123.919 | d41 = 0.15 | | |
| r42 = 148.278 | d42 = 6.42 | n23 = 1.55099 | ν23 = 45.8 |
| r43 = −19.560 | d43 = 1.20 | n24 = 1.81265 | ν24 = 25.4 |
| r44 = −85.685 | d44 = 0.15 | | |
| r45 = 56.956 | d45 = 5.20 | n25 = 1.65223 | ν25 = 33.8 |
| r46 = −41.016 | d46 = 5.00 | | |
| r47 = ∞ | d47 = 30.00 | n26 = 1.60718 | ν26 = 38.0 |
| r48 = ∞ | d48 = 16.20 | n27 = 1.51825 | ν27 = 64.1 |
| r49 = ∞ | | | |

TABLE 3

| Variable spacing | Focal length | | | | |
|---|---|---|---|---|---|
| | 5.20 | 9.01 | 13.00 | 40.11 | 46.80 |
| d17 | 0.67 | 14.54 | 21.64 | 35.73 | 36.91 |
| d25 | 38.97 | 22.67 | 14.50 | 4.79 | 5.56 |
| d28 | 3.60 | 6.03 | 7.10 | 2.71 | 0.77 | aspherical surface shape
surface R1
reference spherical   aspherical
surface R = 133.567   amount (R1)   h   Δ
aspherical surface    70%   (29.63 mm)   192.8 μm
coefficient           90%   (33.33 mm)   525.5 μm
k = 7.994 × D⁰       100%   (37.04 mm)   805.2 μm

TABLE 3-continued

| Variable spacing | Focal length | | | | |
|---|---|---|---|---|---|
| | 5.20 | 9.01 | 13.00 | 40.11 | 46.80 |

$B = -1.640 \times D^{-8}$
$C = -6.238 \times D^{-11}$
$D = -5.429 \times D^{-14}$
$E = -3.622 \times D^{-17}$
zoom parameter
fw/IS = 0.473
hw/ht = 3.358
hw/hz = 1.352
Δν11n−Δν11p = 27.56
f13/f1 = 1.829
Δν13p−Δν13n = 41.83

| (Numerical Value Embodiment 4) | | | |
|---|---|---|---|
| f = 5.0 to 50.0 | fno +1.8 to 2.4 | 2w = 95.5° to 12.6° | |
| (aspherical surface) r1 = 162.851 | d1 = 2.50 | n1 = 1.77621 | v1 = 49.6 |
| r2 = 29.732 | d2 = 17.75 | | |
| r3 = 524.648 | d3 = 2.00 | n2 = 1.73234 | v2 = 54.7 |
| r4 = 95.860 | d4 = 9.01 | | |
| r5 = −109.529 | d5 = 2.00 | n3 = 1.73234 | v3 = 547 |
| r6 = 160.248 | d6 = 0.20 | | |
| r7 = 87.644 | d7 = 10.05 | n4 = 1.81265 | v4 = 254 |
| r8 = −96.083 | d8 = 1.20 | | |
| r9 = −269.902 | d9 = 6.53 | n5 = 1.48915 | v5 = 70.2 |
| r10 = −82.572 | d10 = 10.05 | | |
| r11 = −715.456 | d11 = 2.00 | n6 = 1.81264 | v6 = 25.4 |
| r12 = 39.051 | d12 = 10.95 | n7 = 1.49845 | v7 = 81.6 |
| r13 = −140.417 | d13 = 0.20 | | |
| r14 = 60.043 | d14 = 10.00 | n8 = 1.60520 | v8 = 65.5 |
| r15 = −77.752 | d15 = 0.20 | | |
| (aspherical surface) r16 = 49.302 | d16 = 4.41 | n9 = 1.73234 | v9 = 54.7 |
| r17 = 83.409 | d17 = variable | | |
| r18 = 39.705 | d18 = 0.80 | n10 = 1.88814 | v10 = 40.8 |
| r19 = 12.495 | d19 = 5.02 | | |
| r20 = −48.511 | d20 = 0.80 | n11 = 1.83945 | v11 = 42.7 |
| r21 = −14.391 | d21 = 2.78 | | |
| r22 = 39.562 | d22 = 4.18 | n12 = 1.79191 | v12 = 25.7 |
| r23 = 25.121 | d23 = 0.49 | | |
| r24 = −37.281 | d24 = 0.80 | n13 = 1.82017 | v13 = 46.6 |
| r25 = −32.103 | d25 = variable | | |
| r26 = −303.277 | d26 = 0.80 | n14 = 1.77821 | v14 = 49.6 |
| r27 = −28.949 | d27 = 2.44 | n15 = 1.85501 | v15 = 23.9 |
| r28 = 87.087 | d28 = variable | | |
| r29 = −151.301 | d29 = 1.20 | | |
| r30 = (stop) | d30 = 3.71 | n16 = 1.50014 | v16 = 65.0 |
| r31 = 249400.578 | d31 = 0.15 | | |
| r32 = −42.665 | d32 = 3.40 | n17 = 1.50349 | v17 = 56.4 |
| r33 = 77.871 | d33 = 0.15 | | |
| r34 = −89.166 | d34 = 6.34 | n18 = 1.50349 | v18 = 56.4 |
| r35 = 41.440 | d35 = 1.20 | n19 = 1.82017 | v19 = 46.6 |
| r36 = −35.591 | d36 = 30.00 | | |
| r37 = 861.801 | d37 = 4.29 | n20 = 1.51825 | v20 = 64.2 |
| r38 = −37.509 | d38 = 0.15 | | |
| r39 = −28.353 | d39 = 1.20 | n21 = 1.88814 | v21 = 40.8 |
| r40 = 131.469 | d40 = 5.98 | n22 = 1.51825 | v22 = 64.2 |
| r41 = 17.313 | d41 = 0.15 | | |
| r42 = −109.752 | d42 = 6.42 | n23 = 1.55099 | v23 = 45.8 |
| r43 = 120.858 | d43 = 1.20 | n24 = 1.81265 | v24 = 25.4 |
| r44 = −20.584 | d44 = 0.15 | | |
| r45 = −96.935 | d45 = 5.20 | n25 = 1.65223 | v25 = 33.8 |
| r46 = 44.259 | d46 = 5.00 | | |
| r47 = −30.190 | d47 = 30.00 | n26 = 1.60718 | v26 = 38.0 |
| r48 = ∞ | d48 = 16.20 | n27 = 1.51825 | v27 = 64.1 |
| r49 = ∞ | d49 = | | |
| r50 = ∞ | | | |

TABLE 4

| Variable | Focal length | | | | |
|---|---|---|---|---|---|
| spacing | 5.00 | 8.89 | 12.50 | 37.50 | 50.00 |
| d17 | 0.65 | 15.07 | 21.58 | 35.32 | 37.36 |
| d26 | 36.66 | 19.53 | 12.05 | 3.72 | 6.11 |
| d29 | 6.50 | 9.21 | 10.18 | 4.77 | 0.34 | aspherical surface shape
surface R1
reference spherical
surface R = 162.851  aspherical amount (R1)  h  Δ
aspherical surface  70%  (25.74 mm)  360.2 μm
coefficient  90%  (33.10 mm)  936.9 μm
$k = 1.291 \times D^1$  100%  (36.78 mm)  1400.6 μm
$B = 4.732 \times D^{-7}$  aspherical
$C = -9.614 \times D^{-11}$  amount (R16)  h  Δ
$D = -1.173 \times D^{-13}$  70%  (15.85 mm)  22.4 μm
$E = -5.468 \times D^{-18}$  90%  (20.37 mm)  76.2 μm TABLE 4-continued

| Variable | Focal length | | | | |
|---|---|---|---|---|---|
| spacing | 5.00 | 8.89 | 12.50 | 37.50 | 50.00 |
| surface R16 reference spherical | 100% | | (22.64 mm) zoom parameter fw/IS = 0.454 hw/ht = 3.561 hw/hz = 1.383 Δv11n−Δv11p = 25.86 f13/f1 = 1.82 | | 135.5 μm |

According to the present invention, as described above, there can be achieved a so-called four-unit zoom lens in which the lens disposition of a fore lens unit, the lens disposition of a variator, a focusing system, etc. are appropriately set, and when the maximum incidence height of the on-axis light beam is ht and the incidence height of the off-axis light beam of a maximum angle of view at the wide angle end is hw and the incidence height of the off-axis light beam of a maximum angle of view at a zoom position at a variable power ratio $Z^{1/4}$ is hz, an aspherical surface is provided on at least one surface in the fore lens unit which satisfies 1.65<hw/ht and 1.15<hw/hz, whereby the distortion near the wide angle end is corrected and further the changing of astigmatism, coma and chromatic aberration resulting from a focal length change are corrected in a well-balanced manner and which has high optical performance over the entire variable power range and has an F number on the order of 1.8 at the wide angle end, a wide angle end angle of view $2\overline{\omega}=90°$ to 96°, a large aperture of a variable power ratio of the order of 8.5 to 10 and a wide angle and a high variable power ratio.

What is claimed is:

1. A zoom lens having, in succession from the object side, a first lens unit of positive refractive power, a second lens unit of negative refractive power for focal length change, a third lens unit for correcting the changing of an imaging plane resulting from a focal length change, and a fixed fourth lens unit of positive refractive power, characterized in that said first lens unit has a front lens sub-unit of negative refractive power fixed during focusing, an intermediate lens sub-unit movable along the optical axis thereof for focusing, and a rear lens sub-unit of positive refractive power fixed during focusing, and when the variable power ratio of said zoom lens is Z and the maximum incidence height of an on-axis light beam in the first lens unit is ht and the maximum incidence height of an off-axis light beam of a maximum angle of view at the wide angle end in the first lens unit is hw and the maximum incidence height of the off-axis light beam of a maximum angle of view at a zoom position at a variable power ratio $Z^{1/4}$ is hz, at least one lens surface at a position satisfying 1.65<hw/ht and 1.15<hw/hz is made into an aspherical surface AS1.

2. The zoom lens of claim 1, characterized in that said aspherical surface AS1, when provided on a positive refracting surface, forms a shape in which positive refractive power becomes stronger toward the peripheral portion of the lens, and when provided on a negative refracting surface, forms a shape in which negative refractive power becomes weaker toward the peripheral portion of the lens, and when the combined focal length of said first lens unit in a state in which it is in focus on an object at infinity is f1 and the aspherical amounts at 100%, 90% and 70% of the effective diameter of the lens on which said aspherical surface AS1 is provided are $\Delta 10$, $\Delta 9$ and $\Delta 7$, respectively, said aspherical surface AS1 satisfies the following conditions:

$$1.0 \times 10^{-2} < |\Delta 10/f1| < 5.5 \times 10^{-2}$$

$$7.2 \times 10^{-3} < |\Delta 9/f1| < 3.7 \times 10^{-2}$$

$$2.7 \times 10^{-3} < |\Delta 7/f1| < 1.4 \times 10^{-2}.$$

3. The zoom lens of claim 1, characterized in that said front lens sub-unit is comprised in succession from the object side, of at least two negative lenses and at least one positive lens, the negative lens most adjacent to the object side forms a meniscus shape having its sharp concave surface facing the imaging plane side, and when the average of the Abbe numbers of said at least two negative lenses is $\Delta v11n$ and the Abbe number of said positive lens is $\Delta v11p$, said front lens sub-unit satisfies the following condition:

$$19 < \Delta v11n - \Delta v11p.$$

4. The zoom lens of claim 1, characterized in that said intermediate lens sub-unit comprises at least one positive lens movable toward the imaging plane side during focusing on an object at infinity to an object at a very close distance and having a shape having its sharp convex surface facing the imaging plane side.

5. The zoom lens of claim 1, characterized in that said rear lens sub-unit is comprised of at least one negative lens and at least three positive lenses, and when the focal lengths of said first lens unit and said rear lens sub-unit are f1 and f13, respectively, and the Abbe number of said at least one negative lens is $\Delta v13n$ and the average of the Abbe numbers of said at least three positive lenses is $\Delta v13p$, said rear lens sub-unit satisfies the following conditions:

$$1.5 \leq f13/f1 \leq 2.0$$

$$40 < \Delta v13p - \Delta v13n.$$

6. The zoom lens of claim 1, characterized in that said rear lens sub-unit has an aspherical surface AS2 provided on at least one surface thereof, and said aspherical surface AS2, when provided on a positive refracting surface, forms a shape in which positive refractive power becomes weaker toward the peripheral portion of the lens, and when provided on a negative refracting surface, forms a shape in which negative refractive power becomes stronger toward the peripheral portion of the lens.

7. The zoom lens of claim 6, characterized in that when the aspherical amounts at 100%, 90% and 70% of the effective diameter of the lens on which said aspherical surface AS2 is provided are $\Delta 10$, $\Delta 9$ and $\Delta 7$, respectively, the following conditions are satisfied:

$$4.7 \times 10^{-3} < |\Delta 10/f1| < 7.0 \times 10^{-3}$$

$$2.6 \times 10^{-3} < |\Delta 9/f1| < 4.0 \times 10^{-3}$$

$$7.9 \times 10^{-4} < |\Delta 7/f1| < 1.2 \times 10^{-3}.$$

* * * * *

UNITED STATES PATENT AND TRADEMARK OFFICE
CERTIFICATE OF CORRECTION

PATENT NO. : 6,124,982
DATED : September 26, 2000
INVENTOR(S) : Fumiaki Usui

It is certified that error appears in the above-identified patent and that said Letters Patent is hereby corrected as shown below:

Column 2,
Line 38, "influences" should read -- is influenced --.

Column 8,
Line 42, "greatly remain." should read -- remain to a great extent. --.

Column 9,
Line 59, "jumped up" should read -- increased --.

Column 10,
Line 12, "present" should read -- presently --.
Line 18, "well." should read -- effectively. --.

Column 13,
Line 66, "grately" should read -- greatly --.

Column 14,
Line 51, "(telphot" should read -- (telephoto --.

Column 16,
Line 27, "FIGS." should be deleted.
Line 38, "H-axis" should read -- H-axis is --.
Line 47, in (Numerical Value Embodiment 1): "fno + 1.8 to 2.0" should read -- fno = 1.8 to 2.0 --.
Line 52, in (Numerical Value Embodiment 1): "n3 = 1 76859" should read -- n3 = 1.76859 --.

Column 17,
Line 3, in (Numeral Value Embodiment 1): "fno + 1.8 to 2.0" should read -- fno = 1.8 to 2.0 --.
Line 23, in (Numeral Value Embodiment 1): "n19 = 1 51825" should read -- n19 = 1.51825 --.

UNITED STATES PATENT AND TRADEMARK OFFICE
CERTIFICATE OF CORRECTION

PATENT NO. : 6,124,982
DATED : September 26, 2000
INVENTOR(S) : Fumiaki Usui

It is certified that error appears in the above-identified patent and that said Letters Patent is hereby corrected as shown below:

Column 18,
Line 53, in Table 1, "$\Delta\nu 13n - \Delta\nu 13p = 41.83$" should read -- $\Delta\nu 13p - \Delta\nu 13n = 41.83$ --.
Line 60, in (Numerical Value Embodiment 2): "$\nu 3 = 555$" should read -- $\nu 3 = 55.5$ --.

Column 19,
Line 8, in (Numerical Value Embodiment 2): "$n7 = 1\ 49845$" should read -- $n7 = 1.49845$ --.
Line 12, in (Numerical Value Embodiment 2): "$r16 = 45\ 554$" should read -- $r16 = 45.554$ --.
Line 56, in Table 2: "$\nu 2.14$" should read -- $2.14$ --.

Column 21,
Line 5, in (Numerical Value Embodiment 3): "$\nu 2 = 547$" should read -- $\nu 2 = 54.7$ --.
Line 7, in (Numerical Value Embodiment 3): "$\nu 3 = 547$" should read -- $\nu 3 = 54.7$ --.
Line 9, in (Numerical Value Embodiment 3): "$n4 = 1.81255$" should read -- $n4 = 1.81265$ --.
Line 18, in (Numerical Value Embodiment 3): "$\nu 9 = 547$" should read -- $\nu 9 = 54.7$ --.
Line 25, in (Numerical Value Embodiment 3): "$d23 = o.49$" should read -- $d23 = 0.49$ --.

UNITED STATES PATENT AND TRADEMARK OFFICE
CERTIFICATE OF CORRECTION

PATENT NO. : 6,124,982
DATED : September 26, 2000
INVENTOR(S) : Fumiaki Usui

It is certified that error appears in the above-identified patent and that said Letters Patent is hereby corrected as shown below:

Column 23,
Line 2, in (Numerical Value Embodiment 4): "fno + 1.8 to 2.4" should read
--fno = 1.8 to 2.4 --.
Line 7, in (Numerical Value Embodiment 4): "$v3 = 547$" should read
--$v3 = 54.7$ --.
Line 9, in (Numerical Value Embodiment 4): "$v4 = 254$" should read
-- $v4 = 25.4$ --.
Line 28, in (Numerical Value Embodiment 4): "n14 = 1.77821" should read
-- n14 = 1.77621 --.

Signed and Sealed this

Twenty-first Day of May, 2002

Attest:

JAMES E. ROGAN
*Director of the United States Patent and Trademark Office*

*Attesting Officer*